(12) United States Patent
Willis et al.

(10) Patent No.: US 12,457,276 B2
(45) Date of Patent: Oct. 28, 2025

(54) TECHNOLOGIES FOR MANAGING A FLEXIBLE HOST INTERFACE OF A NETWORK INTERFACE CONTROLLER

(71) Applicant: Intel Corporation, Santa Clara, CA (US)

(72) Inventors: Thomas E. Willis, Redwood City, CA (US); Brad Burres, Waltham, MA (US); Amit Kumar, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/241,748

(22) Filed: Sep. 1, 2023

(65) Prior Publication Data

US 2023/0412365 A1    Dec. 21, 2023

Related U.S. Application Data

(63) Continuation of application No. 17/344,253, filed on Jun. 10, 2021, now Pat. No. 11,843,691, which is a
(Continued)

(30) Foreign Application Priority Data

Aug. 30, 2017    (IN)    .............. 201741030632

(51) Int. Cl.
*G06F 3/06*    (2006.01)
*G06F 9/28*    (2006.01)
(Continued)

(52) U.S. Cl.
CPC ............ *H04L 69/18* (2013.01); *G06F 3/0604* (2013.01); *G06F 3/0605* (2013.01);
(Continued)

(58) Field of Classification Search
CPC . H04L 9/0819; H04L 67/1001; H04L 9/0894; H04L 41/0213; H04L 41/0668;
(Continued)

(56) References Cited

U.S. PATENT DOCUMENTS

| | | |
|---|---|---|
| 5,909,686 A | 6/1999 | Muller et al. |
| 5,974,518 A | 10/1999 | Nogradi |

(Continued)

FOREIGN PATENT DOCUMENTS

| | | |
|---|---|---|
| AU | 2014315117 | 3/2016 |
| CN | 1981272 A | 6/2007 |

(Continued)

OTHER PUBLICATIONS

Notice of Allowance from U.S. Appl. No. 17/344,253 notified Jun. 5, 2023, 10 pgs.

(Continued)

*Primary Examiner* — Tim T Vo
*Assistant Examiner* — Richard B Franklin
(74) *Attorney, Agent, or Firm* — Essential Patents Group, LLP; Christopher K. Gagne

(57) ABSTRACT

Technologies for processing network packets by a host interface of a network interface controller (NIC) of a compute device. The host interface is configured to retrieve, by a symmetric multi-purpose (SMP) array of the host interface, a message from a message queue of the host interface and process, by a processor core of a plurality of processor cores of the SMP array, the message to identify a long-latency operation to be performed on at least a portion of a network packet associated with the message. The host interface is further configured to generate another message which includes an indication of the identified long-latency operation and a next step to be performed upon completion. Additionally, the host interface is configured to transmit the
(Continued)

other message to a corresponding hardware unit scheduler as a function of the subsequent long-latency operation to be performed. Other embodiments are described herein.

20 Claims, 19 Drawing Sheets

Related U.S. Application Data continuation of application No. 15/833,523, filed on Dec. 6, 2017, now abandoned.

(60) Provisional application No. 62/584,401, filed on Nov. 10, 2017.

(51) Int. Cl.

| | |
|---|---|
| G06F 9/4401 | (2018.01) |
| G06F 9/445 | (2018.01) |
| G06F 9/448 | (2018.01) |
| G06F 9/50 | (2006.01) |
| G06F 11/34 | (2006.01) |
| G06F 12/02 | (2006.01) |
| G06F 12/06 | (2006.01) |
| G06F 12/14 | (2006.01) |
| G06F 13/16 | (2006.01) |
| G06F 13/40 | (2006.01) |
| G06F 13/42 | (2006.01) |
| G06F 15/16 | (2006.01) |
| G06F 15/173 | (2006.01) |
| G06F 15/78 | (2006.01) |
| G06F 16/11 | (2019.01) |
| G06F 16/22 | (2019.01) |
| G06F 16/23 | (2019.01) |
| G06F 16/2453 | (2019.01) |
| G06F 16/2455 | (2019.01) |
| G06F 16/248 | (2019.01) |
| G06F 16/25 | (2019.01) |
| G06F 16/901 | (2019.01) |
| G06F 30/34 | (2020.01) |
| G11C 8/12 | (2006.01) |
| G11C 29/02 | (2006.01) |
| G11C 29/36 | (2006.01) |
| G11C 29/38 | (2006.01) |
| G11C 29/44 | (2006.01) |
| H04L 9/08 | (2006.01) |
| H04L 41/0213 | (2022.01) |
| H04L 41/0668 | (2022.01) |
| H04L 41/0677 | (2022.01) |
| H04L 41/0893 | (2022.01) |
| H04L 41/0896 | (2022.01) |
| H04L 41/5025 | (2022.01) |
| H04L 45/28 | (2022.01) |
| H04L 45/7453 | (2022.01) |
| H04L 47/11 | (2022.01) |
| H04L 47/125 | (2022.01) |
| H04L 47/83 | (2022.01) |
| H04L 49/00 | (2022.01) |
| H04L 49/351 | (2022.01) |
| H04L 49/9005 | (2022.01) |
| H04L 67/1001 | (2022.01) |
| H04L 67/1008 | (2022.01) |
| H04L 69/12 | (2022.01) |
| H04L 69/18 | (2022.01) |
| H04L 69/22 | (2022.01) |
| H04L 69/32 | (2022.01) |
| H05K 7/14 | (2006.01) |
| H05K 7/18 | (2006.01) |
| H05K 7/20 | (2006.01) |
| G06F 9/44 | (2018.01) |
| G06F 9/48 | (2006.01) |
| G06F 12/0802 | (2016.01) |
| G06F 12/1045 | (2016.01) |
| G06F 21/10 | (2013.01) |
| G06N 3/063 | (2023.01) |
| G06Q 10/0631 | (2023.01) |
| G06Q 30/0283 | (2023.01) |
| H04L 9/40 | (2022.01) |
| H04L 41/0895 | (2022.01) |
| H04L 41/14 | (2022.01) |
| H04L 41/149 | (2022.01) |
| H04L 41/34 | (2022.01) |
| H04L 41/40 | (2022.01) |
| H04L 41/5019 | (2022.01) |
| H04L 43/20 | (2022.01) |
| H04L 49/40 | (2022.01) |
| H04L 69/321 | (2022.01) |

(52) U.S. Cl.
CPC .......... *G06F 3/0611* (2013.01); *G06F 3/0613* (2013.01); *G06F 3/0629* (2013.01); *G06F 3/0631* (2013.01); *G06F 3/0632* (2013.01); *G06F 3/0644* (2013.01); *G06F 3/0647* (2013.01); *G06F 3/065* (2013.01); *G06F 3/0659* (2013.01); *G06F 3/067* (2013.01); *G06F 3/0673* (2013.01); *G06F 3/0683* (2013.01); *G06F 3/0685* (2013.01); *G06F 9/28* (2013.01); *G06F 9/4406* (2013.01); *G06F 9/4411* (2013.01); *G06F 9/445* (2013.01); *G06F 9/4494* (2018.02); *G06F 9/5022* (2013.01); *G06F 9/505* (2013.01); *G06F 9/5088* (2013.01); *G06F 11/3442* (2013.01); *G06F 12/023* (2013.01); *G06F 12/06* (2013.01); *G06F 12/0607* (2013.01); *G06F 12/14* (2013.01); *G06F 13/1663* (2013.01); *G06F 13/1668* (2013.01); *G06F 13/4068* (2013.01); *G06F 13/42* (2013.01); *G06F 15/161* (2013.01); *G06F 15/17331* (2013.01); *G06F 15/7867* (2013.01); *G06F 16/119* (2019.01); *G06F 16/221* (2019.01); *G06F 16/2237* (2019.01); *G06F 16/2255* (2019.01); *G06F 16/2282* (2019.01); *G06F 16/2365* (2019.01); *G06F 16/2453* (2019.01); *G06F 16/2455* (2019.01); *G06F 16/24553* (2019.01); *G06F 16/248* (2019.01); *G06F 16/25* (2019.01); *G06F 16/9014* (2019.01); *G06F 30/34* (2020.01); *G11C 8/12* (2013.01); *G11C 29/028* (2013.01); *G11C 29/36* (2013.01); *G11C 29/38* (2013.01); *G11C 29/44* (2013.01); *H04L 9/0819* (2013.01); *H04L 9/0894* (2013.01); *H04L 41/0213* (2013.01); *H04L 41/0668* (2013.01); *H04L 41/0677* (2013.01); *H04L 41/0893* (2013.01); *H04L 41/0896* (2013.01); *H04L 41/5025* (2013.01); *H04L 45/28* (2013.01); *H04L 45/7453* (2013.01); *H04L 47/11* (2013.01); *H04L 47/125* (2013.01); *H04L 47/83* (2022.05); *H04L 49/30* (2013.01); *H04L 49/351* (2013.01); *H04L 49/9005* (2013.01); *H04L 67/1001* (2022.05); *H04L 67/1008* (2013.01); *H04L 69/12* (2013.01); *H04L 69/22* (2013.01); *H04L 69/32* (2013.01); *H05K 7/1489*

(2013.01); *H05K 7/18* (2013.01); *H05K 7/20209* (2013.01); *H05K 7/20736* (2013.01); *G06F 9/44* (2013.01); *G06F 9/4401* (2013.01); *G06F 9/4856* (2013.01); *G06F 9/5044* (2013.01); *G06F 9/5055* (2013.01); *G06F 9/5061* (2013.01); *G06F 12/0802* (2013.01); *G06F 12/1054* (2013.01); *G06F 12/1063* (2013.01); *G06F 13/4022* (2013.01); *G06F 15/1735* (2013.01); *G06F 21/105* (2013.01); *G06F 2200/201* (2013.01); *G06F 2201/85* (2013.01); *G06F 2209/5019* (2013.01); *G06F 2209/509* (2013.01); *G06F 2212/1044* (2013.01); *G06F 2212/1052* (2013.01); *G06F 2212/601* (2013.01); *G06F 2213/0026* (2013.01); *G06F 2213/0064* (2013.01); *G06F 2213/3808* (2013.01); *G06N 3/063* (2013.01); *G06Q 10/0631* (2013.01); *G06Q 30/0283* (2013.01); *H04L 41/0895* (2022.05); *H04L 41/14* (2013.01); *H04L 41/149* (2022.05); *H04L 41/34* (2022.05); *H04L 41/40* (2022.05); *H04L 41/5019* (2013.01); *H04L 43/20* (2022.05); *H04L 49/40* (2013.01); *H04L 63/0428* (2013.01); *H04L 69/321* (2013.01); *H05K 7/1498* (2013.01)

(58) Field of Classification Search
CPC ............ H04L 41/0677; H04L 41/0893; H04L 41/0896; H04L 41/5025; H04L 45/28; H04L 45/7453; H04L 47/11; H04L 47/125; H04L 49/30; H04L 49/351; H04L 49/9005; H04L 67/1008; H04L 69/12; H04L 69/22; H04L 69/32; H04L 69/321; H04L 41/14; H04L 41/5019; H04L 49/40; H04L 63/0428; G06F 9/4494; G06F 16/221; G06F 16/2237; G06F 16/24553; G06F 16/2255; G06F 16/2282; G06F 16/9014; G06F 16/2455; G06F 16/25; G06F 16/119; G06F 16/2365; G06F 16/2453; G06F 16/248; G06F 30/34; G06F 1/183; G06F 1/20; G06F 3/0604; G06F 3/0605; G06F 3/0611; G06F 3/0613; G06F 3/0629; G06F 3/0631; G06F 3/0632; G06F 3/0644; G06F 3/0647; G06F 3/065; G06F 3/0659; G06F 3/067; G06F 3/0673; G06F 3/0683; G06F 3/0685; G06F 9/28; G06F 9/4406; G06F 9/4411; G06F 9/445; G06F 9/5044; G06F 9/505; G06F 9/5088; G06F 11/3442; G06F 12/023; G06F 12/06; G06F 12/0607; G06F 12/14; G06F 13/1663; G06F 13/1668; G06F 13/4068; G06F 13/42; G06F 15/161; G06F 15/17331; G06F 15/7807; G06F 15/7867; G06F 9/44; G06F 9/4401; G06F 9/5061; G06F 12/0802; G06F 12/1054; G06F 12/1063; G06F 13/4022; G06F 15/1735; G06F 21/105; G06F 2200/201; G06F 2201/85; G06F 2209/509; G06F 2212/1044; G06F 2212/1052; G06F 2212/601; G06F 2213/0026; G06F 2213/0064; G06F 2213/3808; B25J 15/0014; G11C 8/12; G11C 29/36; G11C 29/38; G11C 29/44; G11C 29/028; H05K 7/1489; H05K 7/18; H05K 7/20209; H05K 7/20736; H05K 7/1498; G06N 3/063; G06Q 10/0631; G06Q 30/0283

See application file for complete search history.

(56) References Cited

U.S. PATENT DOCUMENTS

| | | | |
|---|---|---|---|
| 6,357,003 | B1 | 3/2002 | Zarrin et al. |
| 6,393,483 | B1 | 5/2002 | Latif et al. |
| 6,434,620 | B1 | 8/2002 | Boucher et al. |
| 6,526,442 | B1 | 2/2003 | Stupek, Jr. et al. |
| 7,000,055 | B1 | 2/2006 | Robins et al. |
| 7,502,884 | B1 | 3/2009 | Shah et al. |
| 7,562,366 | B2 | 7/2009 | Pope et al. |
| 8,027,354 | B1 | 9/2011 | Portolani et al. |
| 8,099,487 | B1 | 1/2012 | Smirnov et al. |
| 8,112,491 | B1 | 2/2012 | Michels et al. |
| 8,185,894 | B1 | 5/2012 | Watson et al. |
| 8,296,759 | B1 | 10/2012 | Hutchins et al. |
| 8,477,806 | B2 | 7/2013 | Qiu et al. |
| 8,619,771 | B2 | 12/2013 | Lambeth et al. |
| 8,918,631 | B1 | 12/2014 | Kumar et al. |
| 8,984,178 | B2 | 3/2015 | Michels et al. |
| 9,031,081 | B2 | 5/2015 | Elzur et al. |
| 9,577,879 | B1 | 2/2017 | Kumar et al. |
| 9,594,598 | B1 | 3/2017 | Brouwer et al. |
| 9,983,832 | B1 | 5/2018 | Mayatskikh |
| 10,027,605 | B2 | 7/2018 | Agarwal et al. |
| 10,042,697 | B2* | 8/2018 | Ahad .................. G06F 11/0751 |
| 10,120,727 | B2* | 11/2018 | Bartfai-Walcott .... G06F 9/5072 |
| 10,135,739 | B2 | 11/2018 | Raindel et al. |
| 10,169,068 | B2 | 1/2019 | Brouwer et al. |
| 10,171,309 | B1 | 1/2019 | Smith et al. |
| 10,250,571 | B2* | 4/2019 | Manapragada ....... H04L 67/561 |
| 10,447,728 | B1 | 10/2019 | Steinberg |
| 10,613,888 | B1 | 4/2020 | Mentz et al. |
| 10,630,660 | B1 | 4/2020 | Kumar et al. |
| 10,642,753 | B1 | 5/2020 | Steinberg |
| 10,652,327 | B2 | 5/2020 | Nidugala et al. |
| 10,721,273 | B2 | 7/2020 | Rubakha |
| 10,909,066 | B2 | 2/2021 | Zhu et al. |
| 10,999,219 | B1 | 5/2021 | Athreyapurapu et al. |
| 11,075,948 | B2 | 7/2021 | Gourlay et al. |
| 11,088,988 | B2 | 8/2021 | Chuu |
| 11,687,264 | B2* | 6/2023 | Chang ................. H03M 7/6029 370/254 |
| 2001/0021949 | A1 | 9/2001 | Blightman et al. |
| 2005/0108518 | A1 | 5/2005 | Pandya |
| 2005/0182853 | A1 | 8/2005 | Lewites et al. |
| 2006/0129705 | A1 | 6/2006 | Hayasaka |
| 2006/0136570 | A1 | 6/2006 | Pandya |
| 2006/0165103 | A1 | 7/2006 | Trudeau et al. |
| 2006/0171323 | A1 | 8/2006 | Qian et al. |
| 2007/0011444 | A1 | 1/2007 | Grobman et al. |
| 2007/0050767 | A1 | 3/2007 | Grobman et al. |
| 2007/0067497 | A1 | 3/2007 | Craft et al. |
| 2008/0181245 | A1 | 7/2008 | Basso et al. |
| 2008/0201468 | A1 | 8/2008 | Titus |
| 2008/0244028 | A1 | 10/2008 | Le et al. |
| 2009/0006765 | A1 | 1/2009 | Friedman et al. |
| 2009/0119087 | A1 | 5/2009 | Ang et al. |
| 2009/0216992 | A1 | 8/2009 | Greiner et al. |
| 2009/0268611 | A1 | 10/2009 | Persson et al. |
| 2010/0014526 | A1 | 1/2010 | Chavan et al. |
| 2010/0211946 | A1 | 8/2010 | Elzur |
| 2010/0223397 | A1 | 9/2010 | Elzur |
| 2010/0269109 | A1 | 10/2010 | Cartales |
| 2011/0022812 | A1 | 1/2011 | van der Linden et al. |
| 2011/0023030 | A1 | 1/2011 | Lim et al. |
| 2011/0082962 | A1 | 4/2011 | Horovitz et al. |
| 2011/0090915 | A1 | 4/2011 | Droux et al. |
| 2011/0255549 | A1 | 10/2011 | Nakamura et al. |
| 2011/0265116 | A1 | 10/2011 | Stern et al. |
| 2011/0320632 | A1 | 12/2011 | Karino |
| 2012/0144154 | A1 | 6/2012 | Heller et al. |
| 2012/0167082 | A1 | 6/2012 | Kumar et al. |
| 2012/0246638 | A1 | 9/2012 | He et al. |

(56) References Cited

U.S. PATENT DOCUMENTS

| | | |
|---|---|---|
| 2012/0275328 A1 | 11/2012 | Iwata et al. |
| 2012/0307838 A1 | 12/2012 | Manula et al. |
| 2012/0311208 A1 | 12/2012 | Manula et al. |
| 2012/0324442 A1 | 12/2012 | Barde |
| 2013/0031568 A1 | 1/2013 | Tamir et al. |
| 2013/0042123 A1 | 2/2013 | Smith et al. |
| 2013/0064133 A1 | 3/2013 | Ritz et al. |
| 2013/0151710 A1 | 6/2013 | D'souza et al. |
| 2013/0219030 A1 | 8/2013 | Szabo et al. |
| 2013/0254424 A1 | 9/2013 | Guay et al. |
| 2013/0283266 A1 | 10/2013 | Baset et al. |
| 2013/0343399 A1 | 12/2013 | Kandula et al. |
| 2014/0059160 A1 | 2/2014 | Chernoff et al. |
| 2014/0068137 A1 | 3/2014 | Kegel et al. |
| 2014/0164670 A1 | 6/2014 | Voorhees et al. |
| 2014/0237192 A1 | 8/2014 | Liu et al. |
| 2014/0244965 A1 | 8/2014 | Manula et al. |
| 2014/0259012 A1 | 9/2014 | Nandlall et al. |
| 2014/0289436 A1 | 9/2014 | Lewis |
| 2014/0310704 A1 | 10/2014 | Cantu |
| 2014/0317261 A1 | 10/2014 | Shatzkamer et al. |
| 2014/0334492 A1 | 11/2014 | Mack-Crane |
| 2014/0372723 A1 | 12/2014 | Bobroff et al. |
| 2015/0067229 A1 | 3/2015 | Connor et al. |
| 2015/0128245 A1 | 5/2015 | Brown et al. |
| 2015/0143367 A1 | 5/2015 | Jia et al. |
| 2015/0186173 A1 | 7/2015 | Wang et al. |
| 2015/0215384 A1 | 7/2015 | Bannai et al. |
| 2015/0301945 A1 | 10/2015 | Panesar et al. |
| 2015/0317169 A1 | 11/2015 | Sinha et al. |
| 2015/0350102 A1* | 12/2015 | Leon-Garcia ....... H04L 41/0897 709/226 |
| 2015/0370590 A1 | 12/2015 | Tuch et al. |
| 2016/0085568 A1 | 3/2016 | Dupre et al. |
| 2016/0147556 A1 | 5/2016 | Hu et al. |
| 2016/0149771 A1 | 5/2016 | Prasad et al. |
| 2016/0164832 A1 | 6/2016 | Bellagamba et al. |
| 2016/0165103 A1 | 6/2016 | Topliss |
| 2016/0179717 A1 | 6/2016 | Davis et al. |
| 2016/0210242 A1 | 7/2016 | Fontenot et al. |
| 2016/0254956 A1 | 9/2016 | Xu et al. |
| 2016/0329965 A1 | 11/2016 | Cook et al. |
| 2016/0350151 A1 | 12/2016 | Zou et al. |
| 2016/0359947 A1 | 12/2016 | Rao et al. |
| 2016/0380831 A1 | 12/2016 | Shevenell et al. |
| 2016/0380909 A1 | 12/2016 | Antony et al. |
| 2017/0024341 A1 | 1/2017 | Davda et al. |
| 2017/0031719 A1 | 2/2017 | Clark et al. |
| 2017/0034050 A1 | 2/2017 | Sunavala et al. |
| 2017/0046185 A1 | 2/2017 | Tsirkin |
| 2017/0063628 A1 | 3/2017 | Rasanen |
| 2017/0063652 A1 | 3/2017 | Wu et al. |
| 2017/0063678 A1 | 3/2017 | Rasanen et al. |
| 2017/0099182 A1 | 4/2017 | Debolle et al. |
| 2017/0104609 A1 | 4/2017 | McNamee et al. |
| 2017/0116021 A1 | 4/2017 | Miller |
| 2017/0177396 A1 | 6/2017 | Palermo et al. |
| 2017/0180273 A1 | 6/2017 | Daly et al. |
| 2017/0192921 A1 | 7/2017 | Wang et al. |
| 2017/0257424 A1 | 9/2017 | Neogi et al. |
| 2017/0272274 A1 | 9/2017 | Onno et al. |
| 2017/0279672 A1 | 9/2017 | Krishnan et al. |
| 2017/0337071 A1 | 11/2017 | Scott et al. |
| 2017/0353433 A1 | 12/2017 | Antony et al. |
| 2017/0371698 A1 | 12/2017 | Paolino et al. |
| 2018/0034769 A1 | 2/2018 | Modi et al. |
| 2018/0041905 A1 | 2/2018 | Ashrafi |
| 2018/0059974 A1 | 3/2018 | Tsirkin |
| 2018/0109471 A1 | 4/2018 | Chang et al. |
| 2018/0115585 A1 | 4/2018 | Rubakha |
| 2018/0123963 A1 | 5/2018 | Thubert et al. |
| 2018/0173547 A1 | 6/2018 | Stokes et al. |
| 2018/0191607 A1 | 7/2018 | Kanakarajan |
| 2018/0205673 A1 | 7/2018 | Jain et al. |
| 2018/0212885 A1 | 7/2018 | Contavalli et al. |
| 2018/0219770 A1 | 8/2018 | Wu et al. |
| 2018/0219777 A1 | 8/2018 | He et al. |
| 2018/0285288 A1 | 10/2018 | Bernat et al. |
| 2018/0287864 A1 | 10/2018 | Hockett et al. |
| 2018/0287938 A1 | 10/2018 | Han |
| 2018/0368060 A1 | 12/2018 | Kedalagudde et al. |
| 2018/0373553 A1 | 12/2018 | Connor et al. |
| 2019/0018785 A1 | 1/2019 | Beard et al. |
| 2019/0102213 A1 | 4/2019 | Yousaf et al. |
| 2019/0132211 A1 | 5/2019 | Yeung et al. |
| 2019/0319896 A1 | 10/2019 | Guo et al. |
| 2019/0363985 A1 | 11/2019 | He et al. |
| 2019/0370050 A1 | 12/2019 | Kumar et al. |
| 2020/0065208 A1 | 2/2020 | Vijendra et al. |
| 2020/0204486 A1 | 6/2020 | Wu et al. |
| 2021/0263857 A1 | 8/2021 | Roberts et al. |
| 2021/0306142 A1 | 9/2021 | Willis |
| 2022/0210062 A1 | 6/2022 | Brar et al. |

FOREIGN PATENT DOCUMENTS

| | | |
|---|---|---|
| CN | 101171573 A | 4/2008 |
| CN | 101878475 A | 11/2010 |
| CN | 101894044 A | 11/2010 |
| CN | 102549977 | 7/2012 |
| CN | 103391232 | 11/2013 |
| CN | 104094230 | 10/2014 |
| CN | 105262668 | 1/2016 |
| CN | 106030562 A | 10/2016 |
| CN | 117725004 A | 3/2024 |
| RU | 2645595 | 2/2018 |
| WO | 2005093560 | 10/2005 |
| WO | 2009055556 | 4/2009 |
| WO | 2015061731 | 4/2015 |
| WO | 2019079960 | 5/2019 |

OTHER PUBLICATIONS

Office Action for U.S. Appl. No. 15/833,523, dated Jan. 21, 2021.
Office Action for U.S. Appl. No. 15/833,523, dated Jul. 12, 2021.
"Mellanox Introduces New BlueField Family of System-on-Chip Programmable Processors for Storage and Networking Applications", <https://www.businesswire.com/news/home/20160601005245/en/Mellanox%E2%80%A6p-Programmable-Processors-for-Storage-and-Networking-Applications> Jun. 1, 2016, 7 pgs.
"Mellanox Shipping BlueField SoC Platforms and SmartNIC Adapters", <https://www.storagenewsletter.com/2018/01/10/mellanox-shipping-bluefield-soc-platforms-and-smartnic-adapters/> Jan. 10, 2018, 3 pgs.
Black, Doug, "Mellanox Introduces BlueField SoC Programmable Processors", <https://insidehpc.com/2016/06/mellanox-introduces-new-bluefield-family-of-system-on-chip-programmable-processors-for-storage-and-networking-applications/> Jun. 1, 2016, 8 pgs.
Mellor, Chris, "Mellanox plans to SoC it to storage speed with Multi-ARM BlueField", <https://www.theregister.com/2016/07/22/mellanox_punting_multiarm_bluefield_into_greenfield /> Jul. 22, 2016, 3 pgs.
Mellor, Chris, "Mellanox SoCs it to NVMe over Fabrics with BlueField platform", <https://www.theregister.com/2017/08/09/mellanox_bluefield_soc/> Aug. 9, 2017, 6 pgs.
Trader, Tiffany, "Mellanox Spins EZchip/Tilera IP into BlueField Networking Silicon", <https://www.hpcwire.com/2016/06/01/mellanox-spins-ezchip-acquisition-bluefield-silicon/> Jun. 1, 2016, 10 pgs.
Notice of Allowance from U.S. Appl. No. 17/344,253 notified Aug. 16, 2023, 7 pgs.
Notice of Allowance from Chinese Patent Application No. 202110870167.3 notified Jul. 19, 2024, 7 pgs.
"Endpoint Operations Management Agent Plug-in Development Kit," VMware, Inc., vRealize Operations Manager 6.5, 2018, 81 pgs.
"Mellanox Sets New DPDK Performance Record With ConnectX-5," HPC Wire, Feb. 27, 2017, 3 pgs.
"Network Functions Virtualisation (NFV); Acceleration Technologies; IFA 001: Overview & Use Cases," ETSI GS IFA 001 V0.6.0, Jul. 2015, 50pgs.

(56) References Cited

OTHER PUBLICATIONS

"Network Functions Virtualisation; Part 1: Infrastructure Architecture; Sub-part 4: Architecture of the Hypervisor Domain," GS NFV INF .03 V0.0.2, Jan. 2013, 34 pgs.
"VRealize Operations Definitions for Metrics, Properties, and Alerts," VMware, Inc., vRealize Operations Manager 6.7, Feb. 22, 2019, 215 pgs.
"VRealize Operations Manager 6.7 Help," VMware, Inc., vRealize Operations Manager 6.7, Feb. 22, 2019, 973 pgs.
"VRealize Operations Manager 6.7 Release Notes," Apr. 2, 2019, 12 pgs.
"VRealize Operations Manager API Programming Guide," VMware, Inc., vRealize Operations Manager 6.7, 2018, 30 pgs.
"VRealize Operations Manager Best Practices," Supplemental Guide Version 6.x, Apr. 2018, 20 pgs.
"VRealize Operations Manager Configuration Guide," VMware, Inc., vRealize Operations Manager 6.7, Feb. 22, 2019, 302 pgs.
"VRealize Operations Manager Load Balancing," Configuration guide 6.x, Technical White Paper, Apr. 2018, Version 1.6, 47 pgs.
"VRealize Operations Manager OPS-CLI Help," VMware, Inc., vRealize Operations Manager 6.7, Jul. 19, 2018, 9 pgs.
"VRealize Operations Manager User Guide," VMware, Inc., vRealize Operations Manager 6.7, Jul. 19, 2018, 74 pgs.
"VRealize Operations Manager vApp Deployment Guide," VMware, Inc., vRealize Operations Manager 6.7, Feb. 22, 2019, 53 pgs.
Architecting a VMware vCloud NFV OpenStack Edition NFV Platform, Reference Architecture, Version 2.0, 2017.
Extended European Search Report for European Patent Application No. 17929786.6, dated Apr. 29, 2021.
Extended European Search Report from European Patent Application No. 19183505.7 notified Nov. 27, 2019, 8 pgs.
Extended European Search Report from European Patent Application No. 23167719.6 notified Jul. 5, 2023, 13 pgs.
Final Office Action from U.S. Appl. No. 16/131,012 notified May 10, 2022, 16 pgs.
Final Office Action from U.S. Appl. No. 18/078,382 notified Aug. 19, 2024, 22 pgs.
Final Office Action from U.S. Appl. No. 18/078,382 notified Nov. 15, 2023, 21 pgs.
Final Office Action from U.S. Appl. No. 18/081,358 notified Jan. 29, 2024, 9 pgs.
Final Office Action from U.S. Appl. No. 18/370,246 notified Oct. 25, 2024, 26 pgs.
International Search Report and Written Opinion for PCT Patent Application No. PCT/CN2017/107442, dated Jul. 25, 2018.
Non-Final Office Action from U.S. Appl. No. 16/131,012 notified Nov. 12, 2021, 16 pgs.
Non-Final Office Action from U.S. Appl. No. 18/078,382 notified Feb. 14, 2024, 24 pgs.
Non-Final Office Action from U.S. Appl. No. 18/078,382 notified May 10, 2023, 19 pgs.
Non-Final Office Action from U.S. Appl. No. 18/081,358 notified Oct. 17, 2023, 26 pgs.
Non-Final Office Action from U.S. Appl. No. 18/370,246 notified May 22, 2024, 25 pgs.
Notice of Allowance for U.S. Appl. No. 15/716,890, dated May 25, 2022.
Notice of Allowance from Chinese Patent Application No. 201780095188.4 notified May 17, 2024, 7 pgs.
Notice of Allowance from EP Patent Application No. 19183 505.7 notified Sep. 27, 2021, 7 pgs.
Notice of Allowance from European Patent Application No. 17929786.6 notified Mar. 28, 2023, 8 pgs.
Notice of Allowance from U.S. Appl. No. 16/643,626 notified Apr. 24, 2023, 21 pgs.
Notice of Allowance from U.S. Appl. No. 17/945,455 notified Jul. 18, 2023, 8 pgs.
Notice of Allowance from U.S. Appl. No. 18/370,246 notified Feb. 18, 2025, 8 pgs.
Office Action for U.S. Appl. No. 15/716,890, dated Jun. 10, 2021.
Office Action for U.S. Appl. No. 15/716,890, dated Nov. 27, 2020.
Office Action for U.S. Appl. No. 16/643,626, dated Aug. 9, 2022.
Office Action for U.S. Appl. No. 16/643,626, dated Dec. 7, 2022.
Office Action for U.S. Appl. No. 16/643,626, dated Mar. 2, 2022.
Office Action for U.S. Appl. No. 17/945,455, dated Jan. 20, 2023.
Office Action from Chinese Patent Application No. 201780095188.4 notified Dec. 29, 2023, 11 pgs.
Office Action from Chinese Patent Application No. 201811004869.8 notified Dec. 13, 2024, 14 pgs.
Pfefferele, J., et al., A Hybrid I/O Virtualization Framework for RDMA-capable Network Interfaces, VEE '15, ACM Sigplan Notices, ACM, Mar. 14-15, 2015, pp. 17-30.
Tang, H., et al., IOMMU Para-Virtualization for Efficient and Secure DMA in Virtual Machines, KSII Transactions on Internet and Information Systems, vol. 10, No. 12, Dec. 31, 2016, pp. 5938-5963.
VMware Offers Communications Service Providers the Fastest Path to OpenStack for Network Functions Virtualization, News Releases, Sep. 12, 2017; retrieved online via https://news.vmware.com/releases/vmware-offers-communications-service-providers-the-fastest-path-to-openstack-for-network-functions-virtualization on Sep. 14, 2022.
VMware vCloud NFV The name of the base system (platform), https://tadviser.com/index.php/Product: VMware_vCloud_NFV, Aug. 17, 2022.
"vRealize Suite 2017 Backup and Restore," VMware, Inc., 2017, 63 pgs.
Office Action from Chinese Patent Application No. 201811004869.8 notified Apr. 30, 2025, 40 pgs.
Office Action from Chinese Patent Application No. 201811004869.8 notified Jun. 27, 2025, 20 pgs.

* cited by examiner

TECHNOLOGIES FOR MANAGING A FLEXIBLE HOST INTERFACE OF A NETWORK INTERFACE CONTROLLER

CROSS-REFERENCE TO RELATED APPLICATIONS

This application is a continuation of prior co-pending U.S. patent application Ser. No. 17/344,253, filed on Jun. 10, 2021 and titled "TECHNOLOGIES FOR MANAGING A FLEXIBLE HOST INTERFACE OF A NETWORK INTERFACE CONTROLLER," which is a continuation of prior U.S. patent application Ser. No. 15/833,523, filed on Dec. 6, 2017 and titled "TECHNOLOGIES FOR MANAGING A FLEXIBLE HOST INTERFACE OF A NETWORK INTERFACE CONTROLLER," which claims the benefit of prior Indian Provisional Patent Application No. 201741030632, filed Aug. 30, 2017 and prior U.S. Provisional Patent Application No. 62/584,401, filed Nov. 10, 2017. Each of the aforesaid prior patent applications is hereby incorporated herein by reference in its entirety.

BACKGROUND

In present packet-switched network architectures, data is transmitted in the form of network packets between compute devices and/or device components at a rapid pace. At a high level, data is packetized into a network packet, which is transmitted by a network interface controller (NIC) of one network compute device and received by a NIC of another network compute device. Upon receipt, the network packet is typically processed, classified, etc., and the payload is typically written to memory (e.g., cache, main memory, etc.). Upon having written the network packet data to memory, the receiving NIC may then notify a host central processing unit (CPU) that the data is available for further processing.

Typically, the NIC includes an interface configured to manage the communications between the host CPU and the NIC (e.g., via peripheral component interconnect express (PCI-e)). Accordingly, the NIC can support various features, such as interrupts, direct memory access (DMA) interfaces to the host processors, support for multiple receive and transmit queues, partitioning into multiple logical interfaces, network traffic processing, offloading, etc. To do so, the interface relies on one or more protocols for host software and NIC hardware integration (e.g., to manage messages/communications between host virtual machines (VMs) and physical NIC functions). However, under certain conditions, certain software interface languages may not be supported by a particular NIC, such as may be based on the NIC's vendor, model, etc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
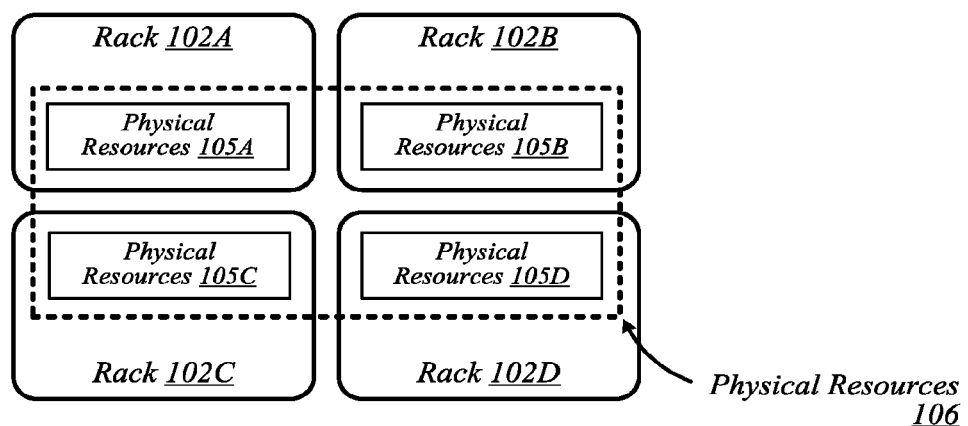
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
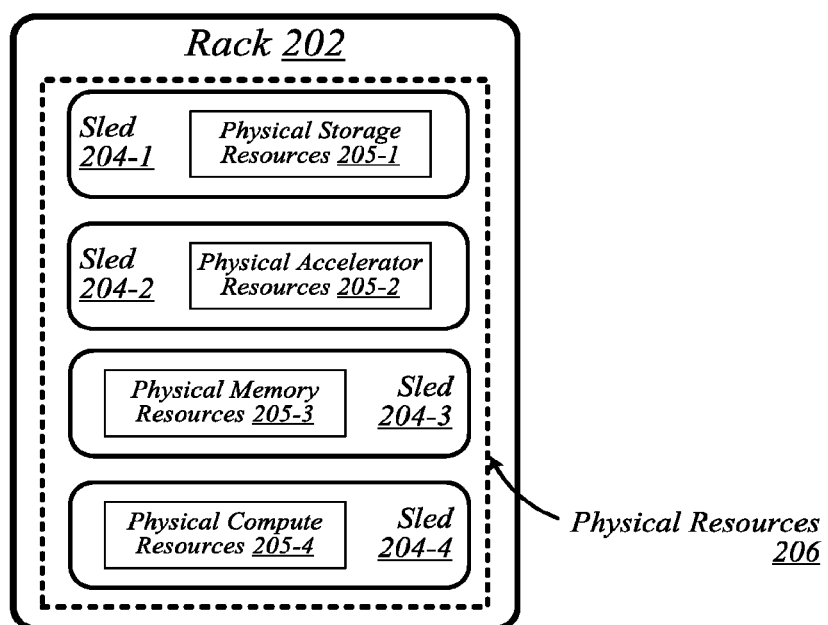
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
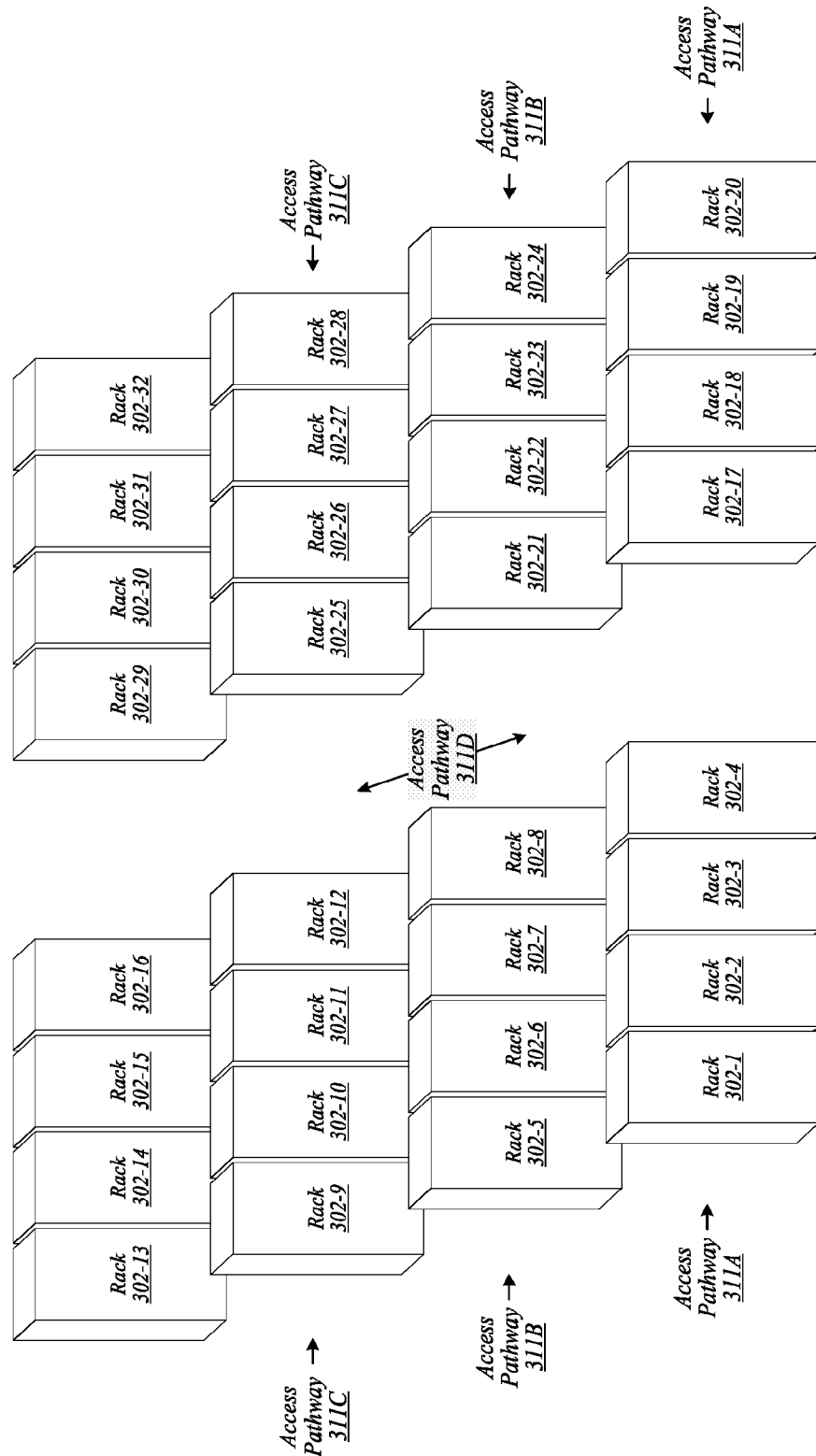
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
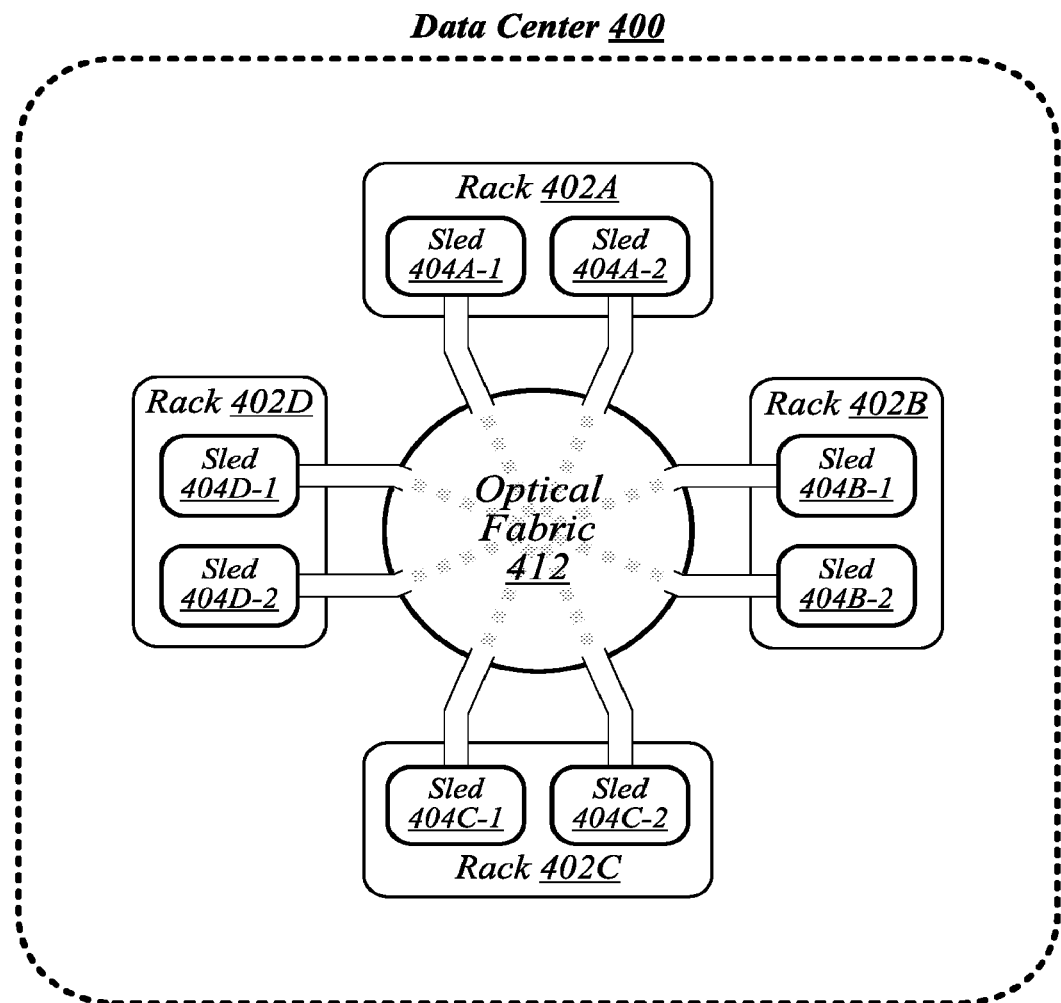
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
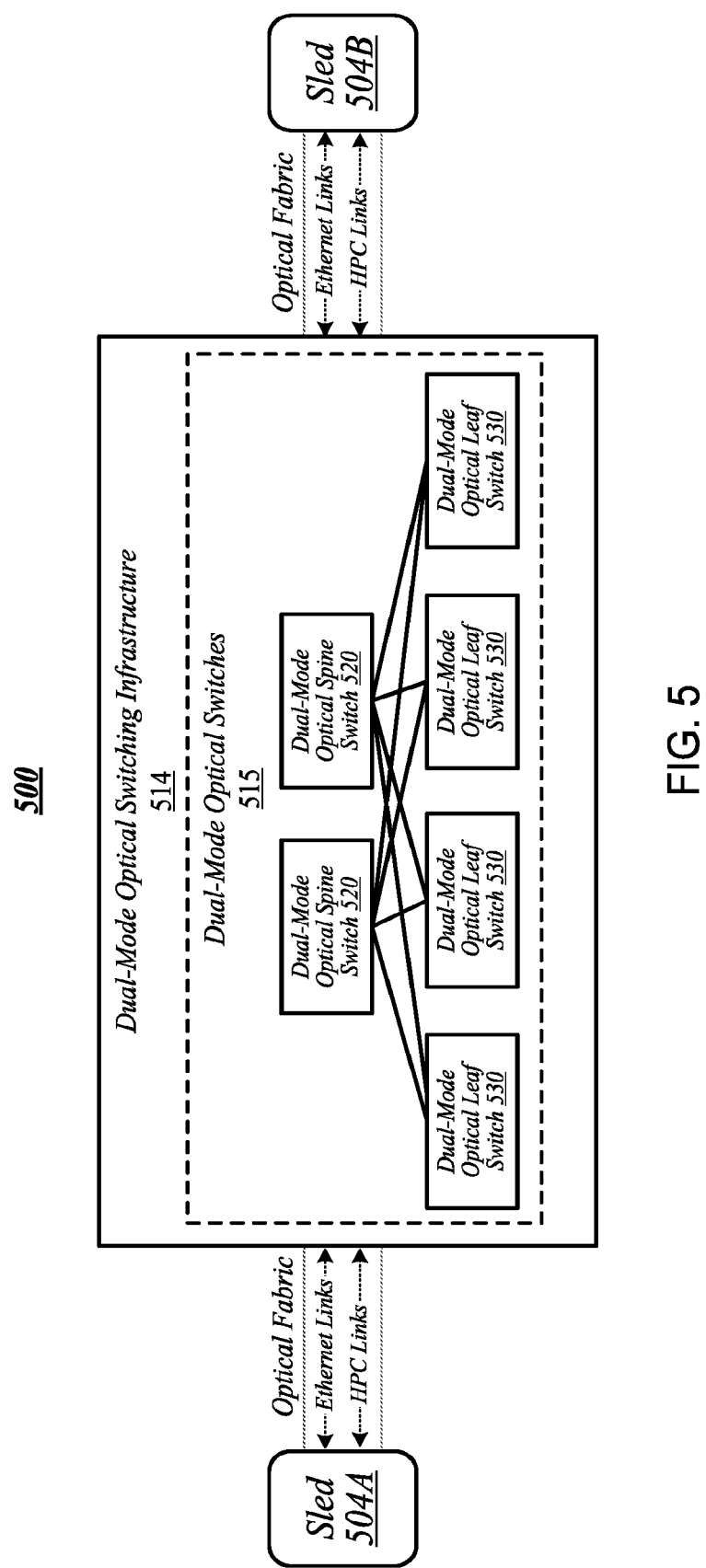
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
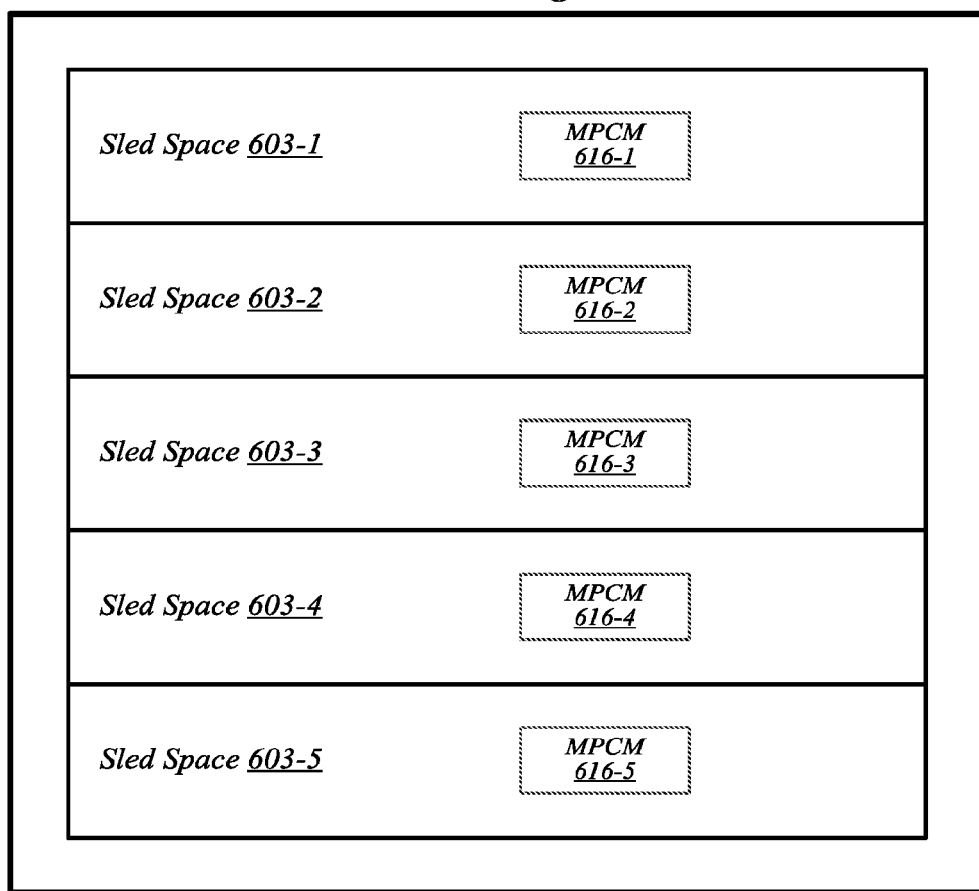
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
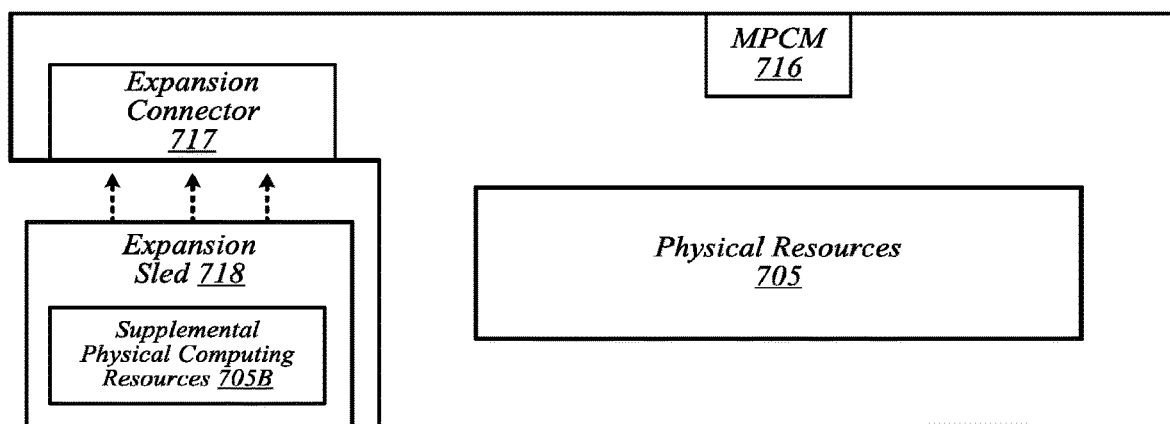
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
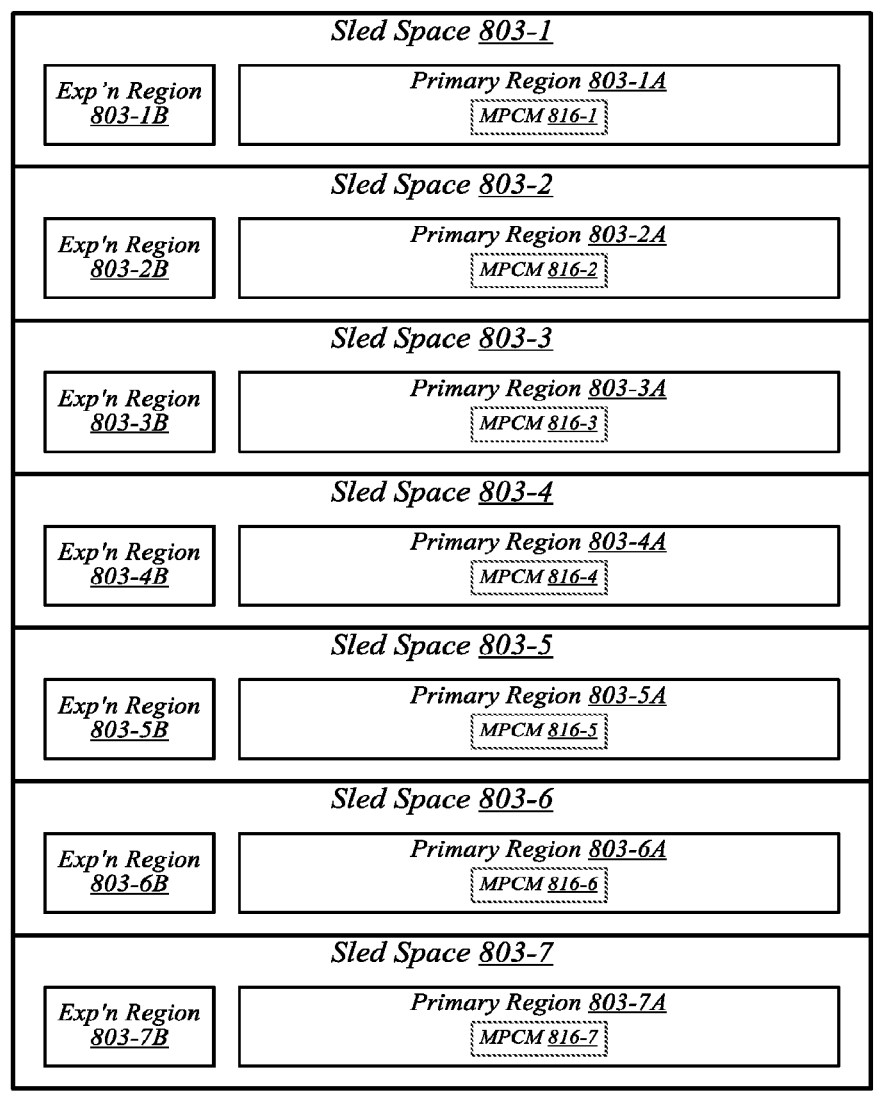
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
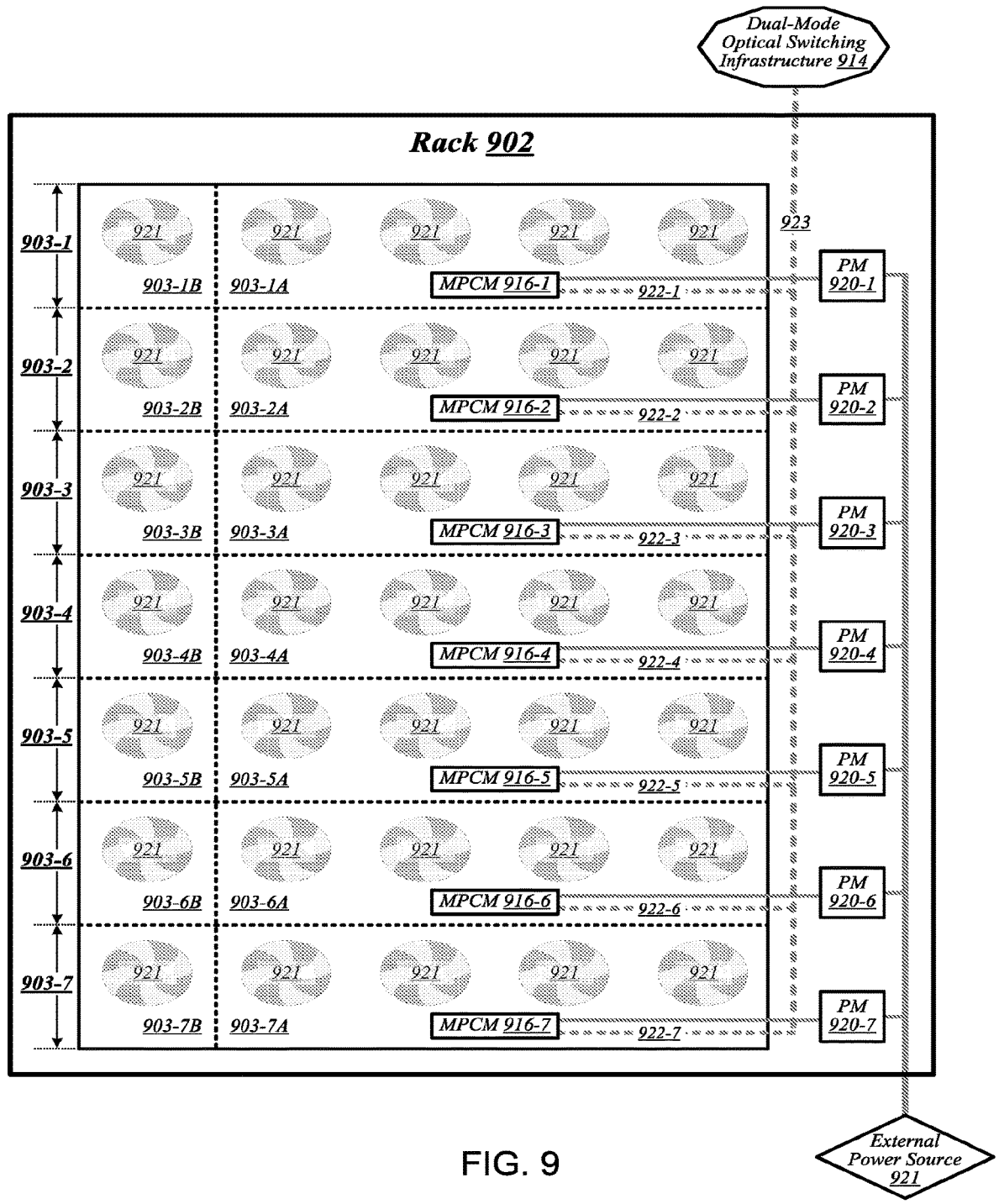
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
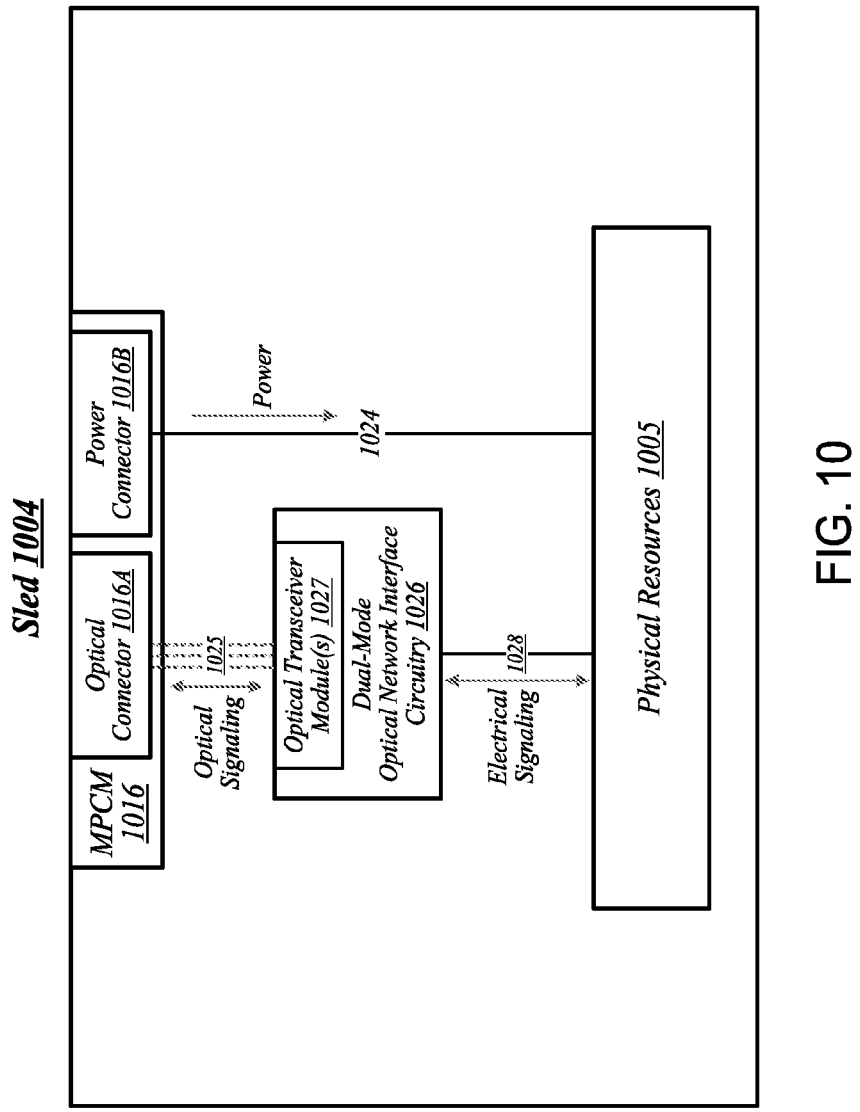
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. does not feature an expansion connector, any given sled that features the design elements of sled 1004 may also feature an expansion connector according to some embodiments. The embodiments are not limited in this context.

Figure 11:
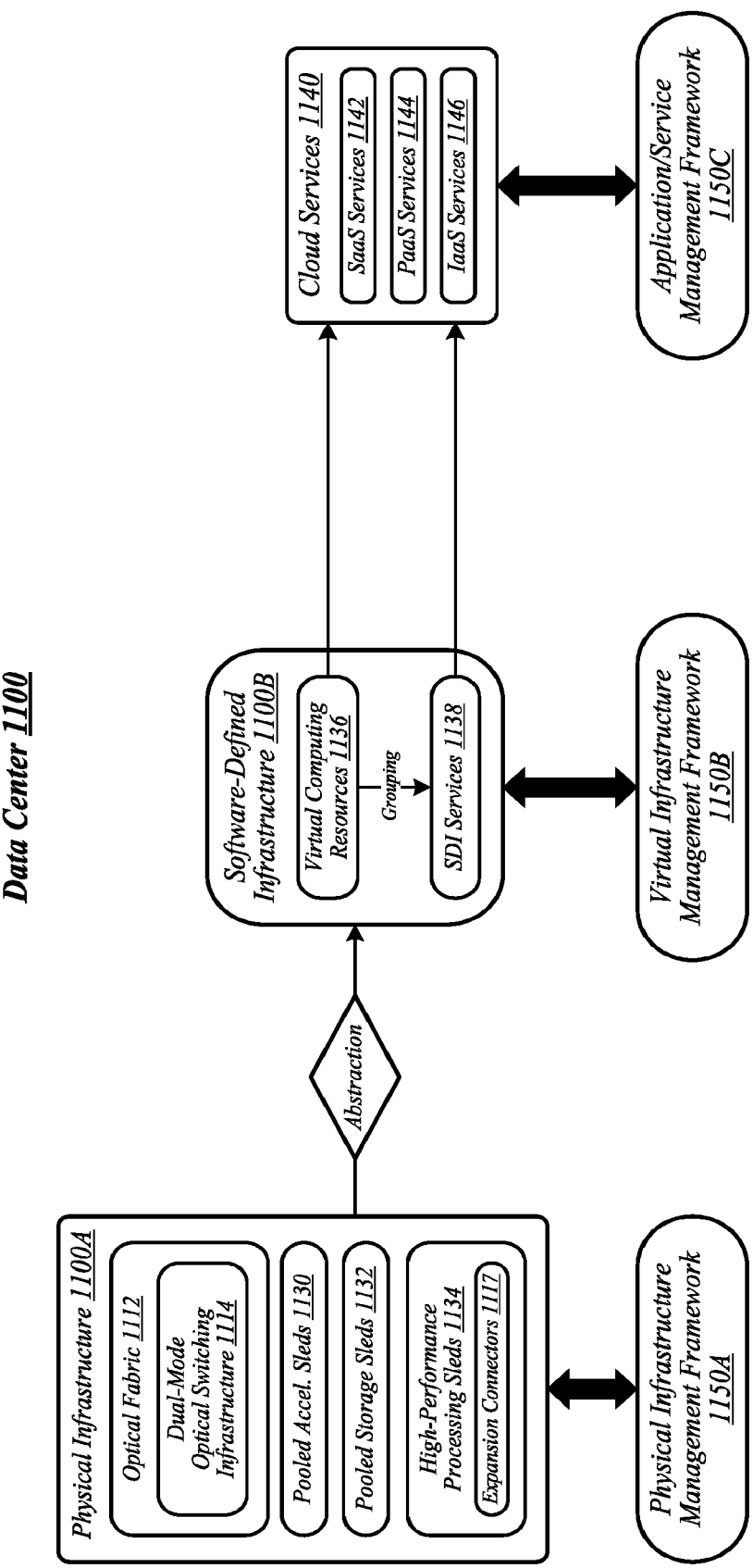
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
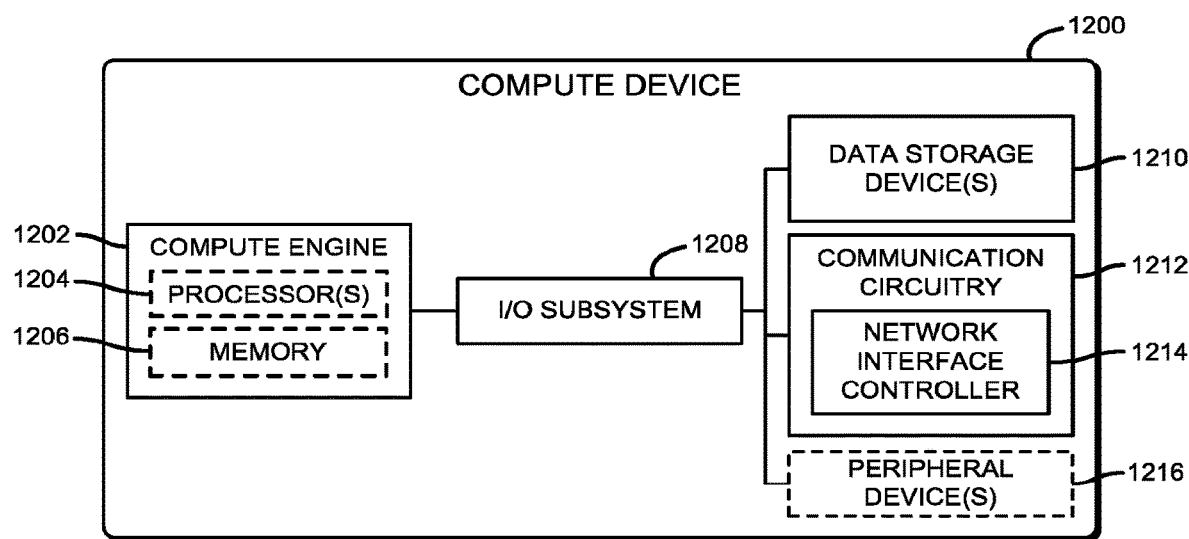
FIG. 12 is a simplified block diagram of at least one embodiment of a compute device for managing a flexible host interface of a network interface controller (NIC) of the compute device.

Referring now to FIG. 12, an illustrative compute device 1200 (e.g., one of the sleds 204, 404, 504, 1004, 1130, 1132, 1134) for managing a host interface includes a network interface controller (NIC) 1214 having a host interface, designated herein as a "flexible host interface." In use, as described in further detail below, the flexible host interface (see, e.g., the flexible host interface 1314 of the NIC 1214 of FIG. 13) is configured to receive messages which trigger various processing events. Such messages require certain protocols for host software and device hardware interactions. Presently, traditional host interfaces typically only support one or a few protocols, which are statically programmed based on a particular driver, model of the NIC, etc. However, unlike traditional host interfaces, the flexible host interface of the illustrative compute device 1200 includes configurable cores of a symmetric multi-processing (SMP) array (see, e.g., the SMP array 1422 of the illustrative flexible host interface 1314 of FIG. 14) in the hardware data path, which allows for support of various drivers, models, etc.

In an illustrative example, the flexible host interface receives an indication that a network packet is to be transmitted from the host (i.e., a processor/CPU of the compute device 1200) to another compute device or that a network packet has been received by the NIC from another compute device. Typically, either the host or the NIC, depending on the ingress/egress direction of the network packet, will notify the flexible host interface that a network packet is ready to be transferred from the host to the NIC (i.e., the network packet is being transmitted to another compute device via the NIC) or that a network packet is ready to be transferred from the NIC to the host (i.e., the network packet has been received from another compute device at the NIC).

Generally, the notification is placed in a queue, ring, or some other type of cache storage structure in a memory of the host.

Figure 14:
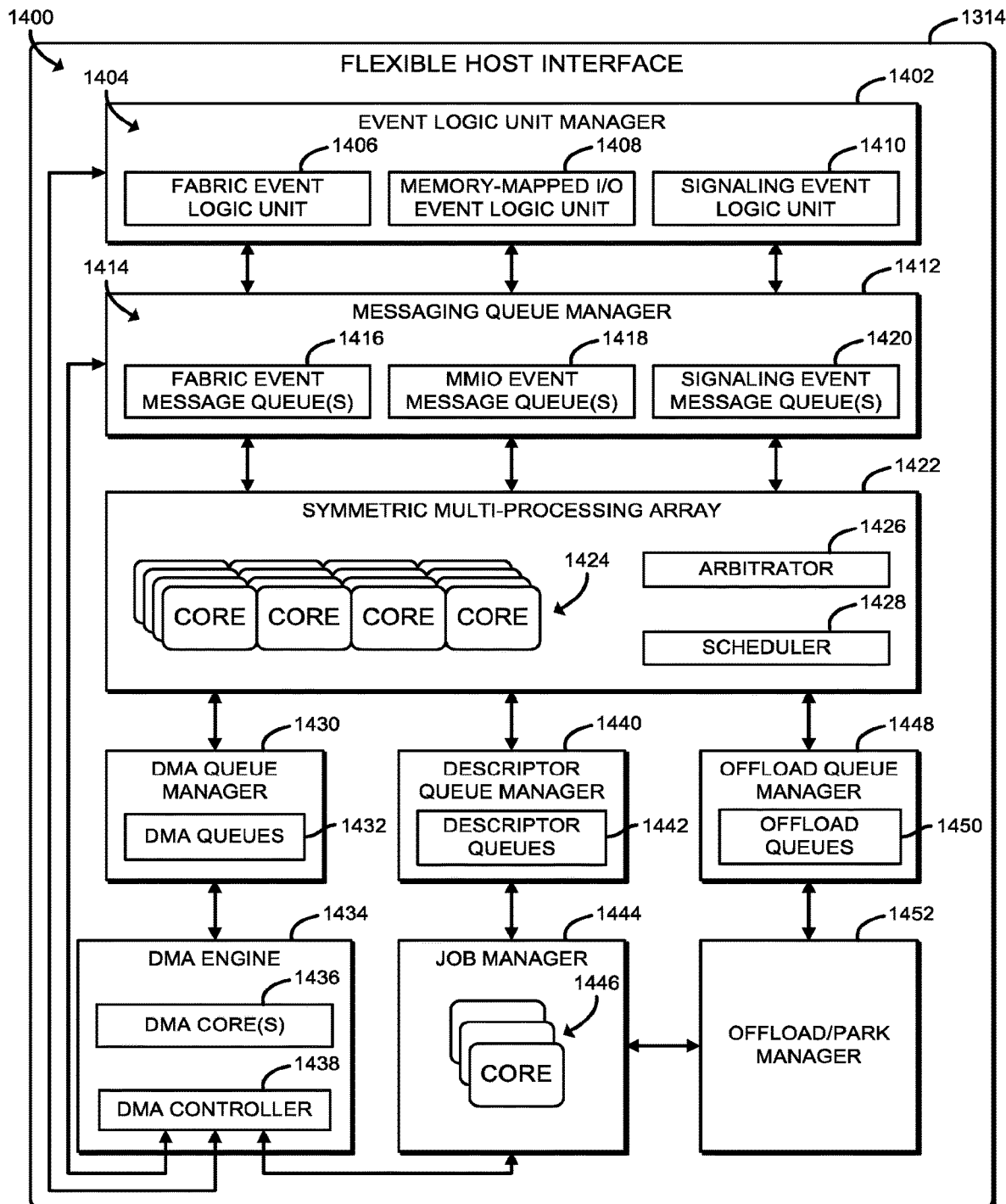
FIG. 14 is a simplified block diagram of at least one embodiment of an environment that may be established by a flexible host interface of the NIC of FIG. 13.

Upon receipt of the message, a job manager of the flexible host interface (see, e.g., the job manager 1444 of the illustrative flexible host interface 1314 of FIG. 14) retrieves a location of a descriptor associated with the message and transmits a message to the SMP array for processing. The descriptor is associated with a particular portion of a network packet, such as a header, a footer, or at least a portion of the payload, and includes information corresponding thereto. For example, the descriptor typically includes information (i.e., descriptor information) usable to identify a storage location of the associated portion of the network packet. Additionally, the descriptor information may be used to identify one or more operations to be performed thereon, such as a network protocol associated with a network packet, a type of data associated with the network packet, a packet flow of the network packet, etc. Accordingly, the descriptor information can be used to identify various operations that are to be performed on the portion of the network packet associated with the descriptor, such as direct memory access (DMA) operations, for example.

Upon receipt of the message by the SMP array, the SMP array identifies a core of the SMP array to process the message, which interprets the message to identify a long-latency operation to be performed (e.g., as a function of the descriptor associated with the received message). A long-latency operation may include any type of operation that requires an amount of time to complete that is above a reference threshold, such as a DMA operation. Upon identifying the long-latency operation, the SMP array generates a message which includes an indication of the identified long-latency operation, as well as a subsequent operation to be performed upon completion of the long-latency operation. For example, a message intended to perform a DMA operation may include information usable to identify that data is to be fetched, a location of the data to be fetched, and an operation to be performed on the data subsequent to the data having been fetched, as well as other information that may be usable to perform the long-latency operation and/or identify the subsequent operation to be performed.

Upon completion of the long-latency operation, the SMP array receives a message indicating the requested long-latency operation has been performed, which the SMP array uses to identify what to do upon receipt of the message (e.g., based on the subsequent operation to be performed upon completion of the long-latency operation as indicated by the received message). For example, the SMP array may determine that another long-latency operation is to be performed (i.e., the aforementioned cycle repeats for the other long-latency operation), or that all long-latency operations have been performed such that the network packet associated with the message is ready to be place on the wire (i.e., for transmission to another compute device) or is ready to be forwarded to the host (i.e., the network packet was received from another compute device).

The compute device 1200 may be embodied as a server (e.g., a stand-alone server, a rack server, a blade server, etc.), a compute node, a storage node, a switch (e.g., a disaggregated switch, a rack-mounted switch, a standalone switch, a fully managed switch, a partially managed switch, a full-duplex switch, and/or a half-duplex communication mode enabled switch), a router, and/or a sled in a data center (e.g., one of the sleds 204, 404, 504, 1004, 1130, 1132, 1134), any of which may be embodied as one or more physical and/or virtual devices. As shown in FIG. 12, the illustrative compute device 1200 includes a compute engine 1202, an input/output (I/O) subsystem 1208, one or more data storage devices 1210, communication circuitry 1212, and, in some embodiments, one or more peripheral devices 1216. Of course, in other embodiments, the compute device 1200 may include other or additional components, such as those commonly found in a compute device (e.g., a power supply, cooling component(s), a graphics processing unit (GPU), etc.). It should be appreciated that they types of components may depend on the type and/or intended use of the compute device 1200. For example, in embodiments in which the compute device 1200 is embodied as a compute sled in a data center, the compute device 1200 may not include the data storage devices. Additionally, in some embodiments, one or more of the illustrative components may be incorporated in, or otherwise form a portion of, another component.

The compute engine 1202 may be embodied as any type of device or collection of devices capable of performing various compute functions described below. In some embodiments, the compute engine 1202 may be embodied as a single device such as an integrated circuit, an embedded system, an FPGA, a system-on-a-chip (SoC), or other integrated system or device. Additionally, in some embodiments, the compute engine 1202 includes or may otherwise be embodied as a processor 1204 and a memory 1206. The processor 1204 may be embodied as any type of processor capable of performing the functions described herein. For example, the processor 1204 may be embodied as one or more single or multi-core processors, a microcontroller, or other processor or processing/controlling circuit. In some embodiments, the processor 1204 may be embodied as, include, or otherwise be coupled to an FPGA, an application specific integrated circuit (ASIC), reconfigurable hardware or hardware circuitry, or other specialized hardware to facilitate performance of the functions described herein.

The memory 1206 may be embodied as any type of volatile (e.g., dynamic random access memory (DRAM), etc.) or non-volatile memory or data storage capable of performing the functions described herein. It should be appreciated that the memory 1206 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1206 may be integrated into the processor 1204. In operation, the memory 1206 may store various software and data used during operation such as job request data, kernel map data, telemetry data, applications, programs, libraries, and drivers.

The compute engine 1202 is communicatively coupled to other components of the compute device 1200 via the I/O subsystem 1208, which may be embodied as circuitry and/or components to facilitate input/output operations with the compute engine 1202 (e.g., with the processor 1204 and/or the memory 1206) and other components of the compute device 1200. For example, the I/O subsystem 1208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1208 may form a portion of a SoC and be incorporated, along with one or more of the processor 1204, the memory 1206, and other components of the compute device 1200, into the compute engine 1202.

In some embodiments, the compute device 1200 may include one or more data storage devices 1210, which may be embodied as any type of devices configured for short-term or long-term storage of data such as, for example, memory devices and circuits, memory cards, hard disk drives, solid-state drives, or other data storage devices. Each data storage device 1210 may include a system partition that stores data and firmware code for the data storage device 1210. Additionally, each data storage device 1210 may also include an operating system partition that stores data files and executables for an operating system.

The communication circuitry 1212 may be embodied as any communication circuit, device, or collection thereof, capable of enabling network communications between the compute device 1200 and another compute device (e.g., a source compute device) over a network (not shown). Such a network may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Accordingly, the communication circuitry 1212 may be configured to use any one or more communication technology (e.g., wired or wireless communications) and associated protocols (e.g., Ethernet, Bluetooth®, Wi-Fi®, WiMAX, etc.) to effect such communication. As noted previously, the illustrative communication circuitry 1212 includes the NIC 1214, which may also be referred to as a smart NIC or an intelligent/smart host fabric interface (HFI), and is described in further detail in FIGS. 13 and 14. The NIC 1214 may be embodied as one or more add-in-boards, daughter cards, network interface cards, controller chips, chipsets, or other devices that may be used by the compute device 1200 to transmit/receive network communications to/from another compute device.

The peripheral device(s) 1216 may include any type of device that is usable to input information into the compute device 1200 and/or receive information from the compute device 1200. The peripheral devices 1216 may be embodied as any auxiliary device usable to input information into the compute device 1200, such as a keyboard, a mouse, a microphone, a barcode reader, an image scanner, etc., or output information from the compute device 1200, such as a display, a speaker, graphics circuitry, a printer, a projector, etc. It should be appreciated that, in some embodiments, one or more of the peripheral devices 1216 may function as both an input device and an output device (e.g., a touchscreen display, a digitizer on top of a display screen, etc.). It should be further appreciated that the types of peripheral devices 1216 connected to the compute device 1200 may depend on, for example, the type and/or intended use of the compute device 1200. Additionally or alternatively, in some embodiments, the peripheral devices 1216 may include one or more ports, such as a USB port, for example, for connecting external peripheral devices to the compute device 1200.

Figure 13:
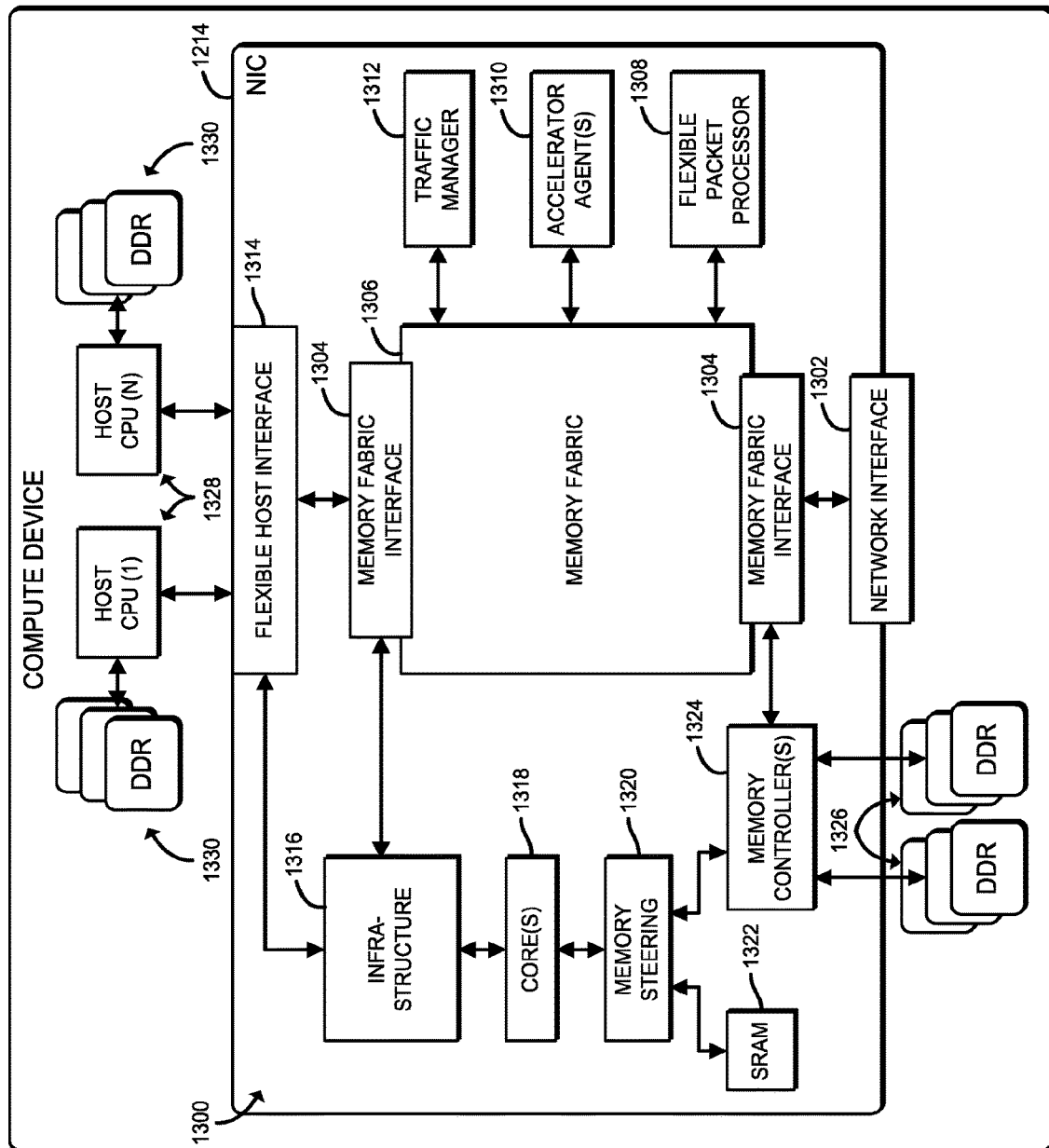
FIG. 13 is a simplified block diagram of at least one embodiment of an environment that may be established by the NIC of FIG. 12.

Referring now to FIG. 13, the NIC 1214 of the compute device 1200 of FIG. 12 may establish an environment 1300 during operation. The illustrative environment 1300 includes a network interface 1302, a memory fabric 1306 of a memory fabric 1306, a flexible packet processor (FXP) 1308, one or more accelerator agents 1310, a traffic manager 1312, the flexible host interface 1314, an infrastructure 1316, one or more on-die processing cores 1318, a memory steering unit 1320, an SRAM 1322, and one or more memory controllers 1324 communicatively coupled to DDR SDRAM 1326. The various components of the environment 1300 may be embodied as hardware, firmware, software, or a combination thereof. As such, in some embodiments, one or more of the components of the environment 1300 may be embodied as circuitry or collection of electrical devices. Additionally, in some embodiments, one or more of the illustrative components may form a portion of another component and/or one or more of the illustrative components may be independent of one another.

The network interface 1302 is configured to receive inbound network traffic and route/transmit outbound network traffic. To facilitate the receipt of inbound and transmission of outbound network communications (e.g., network traffic, network packets, network packet flows, etc.) to/from the compute device 1200, the network interface 1302 is configured to manage (e.g., create, modify, delete, etc.) connections to physical and virtual network ports (i.e., virtual network interfaces) of the NIC 1214, as well as the ingress/egress buffers/queues associated therewith. The network interface 1302 is additionally configured to coordinate with the memory fabric interface 1304 to store the contents (e.g., header(s), payload, footer(s), etc.) of network packets received at the network interface 1302 to the memory fabric 1306.

It should be appreciated that the memory fabric 1306 includes multiple memory storage components (not shown) referred to herein as segments, each of which are usable to support the distributed storage of the contents of a network packet. Accordingly, it should be appreciated that the memory fabric interface 1304 is configured to manage the data writes to the segments in a distributed fashion and provide an indication (e.g., a pointer) usable to identify the storage locations of the segments in which the contents of each network packet has been stored. Additionally, the memory fabric interface 1304 is configured to notify the FXP 1308 when a network packet has been stored in the memory fabric 1306 and provide the memory fabric location pointer(s) to the FXP 1308.

The one or more accelerator agents 1310 are configured to perform an acceleration operation on at least a portion of a network packet. For example, the accelerator agents 1310 may include a remote direct memory access (RDMA) operation, a cryptography operation, or any other type of acceleration. The traffic manager 1312 is configured to perform traffic-management in the packet-processing data path, such as may be performed to enforce service-level agreements (SLAs). As will be described in additional detail below, the traffic manager 1312 is configured to throttle the transmission of network packets from the host CPU(s) to the wire.

The one or more on-die cores 1318 are configured to perform computations local to the NIC 1214. Accordingly, the on-die cores 1318 can provide computational power to perform certain operations without the data being operated on having to be moved to a location remote of the NIC 1214, thereby eliminating the latency otherwise introduced by moving the data. The infrastructure 1316 may include various components to manage the communications, state, and controls of the on-die cores 1318 and/or the host interface 1314, such as a serial communication interface (e.g., a universal asynchronous receiver and transmitter (UART), a serial peripheral interface (SPI) bus, etc.), a testing/debugging interface, a digital thermal sensor, I/O controllers, etc.

The SRAM 1322 is communicatively coupled to the on-die cores 1318 via a memory steering unit 1320 and may be used to store data (e.g., work queues, notifications, interrupts, headers, descriptors, critical structures, etc.) for the on-die cores 1318. Additionally, the memory steering unit 1320 is also coupled to one or more memory controllers 1324. The memory controllers 1324 may be double data rate (DDR) memory controllers configured to drive the DDR SDRAM 1326 external to, but managed by the NIC 1214, rather than the host CPUs (e.g., the processor(s) 1204 of the compute engine 1202 of FIG. 12). Accordingly, accesses to the DDR SDRAM 1326 are faster relative to accesses to the DDR SDRAM 1330 (i.e., host memory) of the host CPUs 1328. The memory controllers 1324 are additionally communicatively coupled to the memory fabric 1306 via the memory fabric interface 1304, such that data stored in the DDR SDRAM 1326 can be transferred to/from the memory fabric 1306.

The flexible host interface 1314 may be embodied as any type of host interface device capable of performing the functions described herein. The flexible host interface 1314 is configured to function as an interface between each of the host CPUs 1328 (e.g., each of the processors 1204 of the compute engine 1202 of FIG. 12) and the NIC 1214. As illustratively shown, the flexible host interface 1314 is configured to function as an interface between the host CPUs 1328 (e.g., one of the processors 1204 of the compute engine 1202 of FIG. 12) and the memory fabric 1306 (e.g., via the memory fabric interface 1304), as well as function as an interface between the host CPUs 1328 and the infrastructure 1316. Accordingly, messages and/or network packet data may be passed therebetween via one or more communication links, such as PCIe interconnects, to provide access to the host memory 1330 (e.g., the memory 1206 of the compute engine 1202 of FIG. 12).

Referring now to FIG. 14, the flexible host interface 1314 of the NIC 1214 of FIGS. 12 and 13 may establish an environment 1400 during operation. The illustrative environment 1400 includes an event logic unit manager 1402, a messaging queue manager 1412, an SMP array 1422, a DMA queue manager 1430, a DMA engine 1434, a descriptor queue manager 1440, a job manager 1444, an offload queue manager 1448, and an offload/park manager 1452. The various components of the environment 1400 may be embodied as physical and/or virtual hardware, firmware, software, or a combination thereof. As such, in some embodiments, one or more of the components of the environment 1400 may be embodied as circuitry or collection of electrical devices. Additionally, in some embodiments, one or more of the illustrative components may form a portion of another component and/or one or more of the illustrative components may be independent of one another.

The event logic unit manager 1402 includes multiple event logic units 1404, each of which are configured to receive (e.g., via a PCIe connection) inbound event notifications received at the flexible host interface 1314. To do so, the illustrative event logic unit manager 1402 includes a fabric event logic unit 1406, a memory-mapped I/O (MMIO) event logic unit 1408, and a signaling event logic unit 1410. It should be appreciated that the event logic units 1404 of the event logic unit manager 1402 are not limited to those of the illustrative event logic unit manager 1402. In other words, in other embodiments, the event logic unit manager 1402 may be configured to manage additional and/or alternative event logic units 1404.

Each of the event logic units 1404 are configured to receive a particular type, or set of types, of event messages, as well as interpret and queue messages corresponding to the received messaged. Additionally, each of the event logic units 1404 are configured to build data structures based on an associated protocol which is readable by the SMP array 1422. For example, the fabric event logic unit 1406 may be configured to receive and interpret host fabric interface events, such as a message indicating a network packet is to be transmitted between the NIC 1214 and one of the host CPUs 1328. The MMIO event logic unit 1408 may be configured to receive and interpret an indication from a host software application that data, a notification, or a message is available. The signaling event logic unit 1410 may be configured to receive and interpret fixed function signal requests (e.g., interrupts) between the NIC 1214 and the host CPUs 1328.

The messaging queue manager 1412 is configured to manage event message queues 1414 between the event logic units 1404 and the SMP array 1422. To do so, the messaging queue manager 1412 is configured to create/destroy the appropriate event message queues 1414 based on the corresponding event logic units 1404. In some embodiments, the messaging queue manager 1412 is additionally configured to enqueue and dequeue messages into/from the appropriate one of the event message queues 1414. The illustrative messaging queue manager 1412 includes one or more fabric event queues 1416 (i.e., for queueing messages received from the fabric event logic unit 1406), one or more MMIO event queues 1418 (i.e., for queueing messages receive from the MMIO event logic unit 1408), and one or more signaling event queues 1420 (i.e., for queueing messages receive from the signaling event logic unit 1410).

The SMP array 1422, which is described in further detail throughout, is configured to process queued messages of various types having various formats (e.g., via pipeline structured logic). To do so, the illustrative SMP array 1422 includes a pool of processor cores 1424, an arbitrator 1426, and a scheduler 1428. While the pool of processor cores 1424 illustratively shows 16 cores, it should be appreciated the pool of processor cores 1424 may include any number of multiple cores (e.g., 4 cores, 8 cores, 32 cores, etc.) depending on the embodiment. For example, the number of processor cores 1424 which may depend on the intended use of the NIC 1214 (e.g., model), or the processor cores 1424 themselves (e.g., a certain number of cores dedicated to processing a particular message type while a certain number of other cores are dedicated to processing another message type, etc.). Each of the processor cores 1424 may be embodied as any type of processor core capable of performing the functions described herein, such as general purpose cores, application-specific instruction set processors, and/or the like. The arbitrator 1426 is configured to manage arbitration between messages to be processed by the SMP array 1422, while the scheduler 1428 is configured to schedule the messages for processing by the SMP array 1422, such as to a particular one of the processor cores 1424.

The DMA queue manager 1430 is configured to manage one or more DMA queues 1432. To do so, the DMA queue manager 1430 is configured to create/destroy the DMA queues 1432, as may be required from time to time. In some embodiments, the DMA queue manager 1430 is additionally configured to queue/dequeue messages received from the SMP array 1422 for receipt by the DMA engine 1434 and/or queue/dequeue messages received from the DMA engine 1434 for receipt by the SMP array 1422.

The DMA engine 1434 is configured to facilitate DMA operations to be performed. Accordingly, the DMA engine 1434 can access host memory (e.g., the host memory 1330 of FIG. 13) independent of the host CPU (e.g. one of the host CPUs 1328 of FIG. 13). To do so, the illustrative DMA engine 1434 includes one or more DMA cores 1436 and a DMA controller 1438. The DMA cores 1436 are configured to interpret messages from the DMA queues 1432 and perform the DMA fetch operations associated therewith. The DMA controller 1438 is configured to schedule/pre-fetch the messages from the DMA queues 1432. The DMA controller 1438 may be additionally configured to manage the scheduling of messages received from other components of the flexible host interface 1314, such as the event logic unit manager 1402, the messaging queue manager 1412, and the job manager 1444, for example.

The descriptor queue manager 1440 is configured to manage one or more descriptor queues 1442. To do so, the descriptor queue manager 1440 is configured to create/destroy the descriptor queues 1442, as may be required from time to time. In some embodiments, the descriptor queue manager 1440 is additionally configured to queue/dequeue messages received from the SMP array 1422 for receipt by the job manager 1444 and/or queue/dequeue messages received from the job manager 1444 for receipt by the SMP array 1422.

The job manager 1444, as will be described in further detail below, is configured to manage the distribution of descriptors received for processing. To do so, the illustrative job manager includes multiple processor cores 1442. Each of the processor cores 1442 may be embodied as any type of processor core capable of performing the functions described herein, such as general purpose cores, application-specific instruction set processors, and/or the like. The job manager 1444 may be configured to regulate which descriptors are processed by which processor cores 1442. For example, in some embodiments, the job manager 1444 may identify a flow associated with the descriptor and determine which of the processor cores 1442 should process the descriptor as a function of the flow. Alternatively, in other embodiments, the job manager 1444 may be configured to process a descriptor as a function of which of the processor cores 1442 is available.

In some embodiments, the job manager 1444 may be configured to communicate with a traffic manager of the NIC 1214 (e.g., the traffic manager 1312 of the illustrative NIC 1214 of FIG. 13). In other words, in such embodiments, the job manager 1444 may be configured to only process descriptors based on certain conditions as set forth by the traffic manager 1312. For example, the job manager 1444 may be configured to receive an authorized traffic limit from the traffic manager 1312, which indicates a size (e.g., a number of bits, a total number, etc.) of network packets which the job manager 1444 is allowed to queue (i.e., in one of the descriptor queues 1442). Accordingly, the job manager 1444 effectively throttles the amount of traffic that is being processed by the SMP array 1422 and transmitted from the NIC 1214.

The offload queue manager 1448 is configured to manage one or more offload queues 1450. To do so, the offload queue manager 1448 is configured to create/destroy the offload queues 1450, as may be required from time to time. In some embodiments, the offload queue manager 1448 is additionally configured to queue/dequeue messages received from the SMP array 1422 for receipt by the offload/park manager 1452 and/or queue/dequeue messages received from the offload/park manager 1452 for receipt by the SMP array 1422.

The offload/park manager 1452 is configured to manage offload and park operations to be performed on at least a portion of a network packet (e.g., a header, a footer, a payload, or a portion thereof). For example, the offload/park manager 1452 may be configured to manage checksum validations, tag extractions, segmentation, etc.

Figure 15:
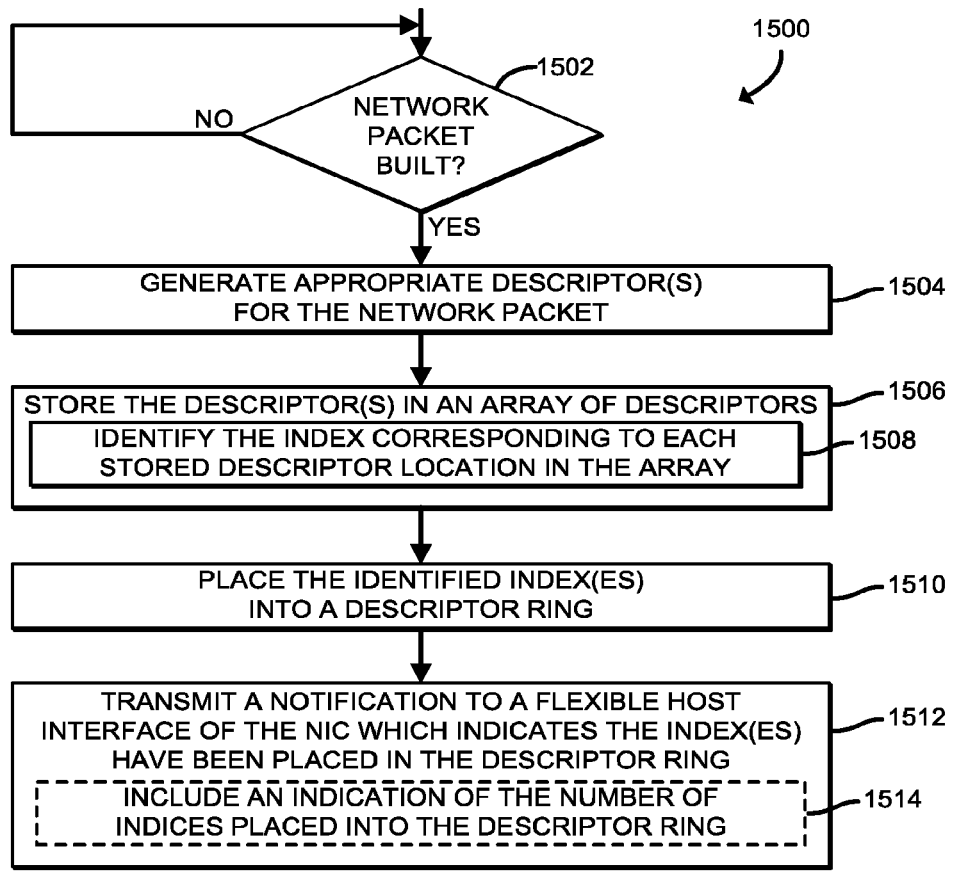
FIG. 15 is a simplified flow diagram of at least one embodiment of a method for generating descriptor(s) for a network packet that may be performed by a host CPU of the compute device of FIG. 12.

Referring now to FIG. 15, in use, the compute device 1200, or more particularly a host CPUs of the compute device 1200 (e.g., one of the host CPUs 1328 of FIG. 13), may execute a method 1500 for generating one or more descriptors for a network packet. The method 1500 begins in block 1502, in which the host CPU 1328 determines whether a network packet has been built for transmission to another compute device. If so, the method 1500 advances to block 1504, in which the host CPU 1328 generates one or more appropriate descriptors for the network packet. It should be appreciated that more than one descriptor may correspond to a given network packet.

As described previously, descriptors are associated with a network packet, or a particular portion thereof. Accordingly, for example, one descriptor may correspond to a payload of the network packet, while another descriptor may correspond to a header of the network packet. The descriptor additionally includes information (i.e., descriptor information) usable to identify a storage location of the associated portion of the network packet, as well as a network protocol associated with a network packet. In some embodiments, the descriptor may include additional information which indicates or is otherwise usable to identify a type of data associated with the network packet, a packet flow of the network packet, etc. Accordingly, the descriptor information may be used to identify one or more operations to be performed thereon.

In block 1506, the host CPU 1328 stores the generated descriptor(s) into an array of descriptors. In some embodiments, the array of descriptors may be structured as a descriptor table stored in a cache memory accessible by the host CPU 1328. It should be appreciated that, in other embodiments, the descriptor(s) may be placed into an alternative cache data structure. In block 1508, the host CPU 1328 identifies the array index corresponding to each location of the stored descriptor(s). In block 1510, the host CPU 1328 places the identified index(es) into a descriptor ring, which may be stored in a cache memory accessible by the host CPU 1328. In block 1512, the host CPU 1328 transmits a notification (i.e., a descriptor notification) to a flexible host interface (e.g., the illustrative flexible host interface 1314 of FIG. 14) of the NIC 1214 which notifies the NIC 1214 that the one or more generated descriptors have been placed into to the array of descriptors and the corresponding index(s) in the descriptor ring. Additionally, in some embodiments, in block 1514, the host CPU 1328 may include in the notification an indication of the number of indices placed into the descriptor ring.

Figure 16:
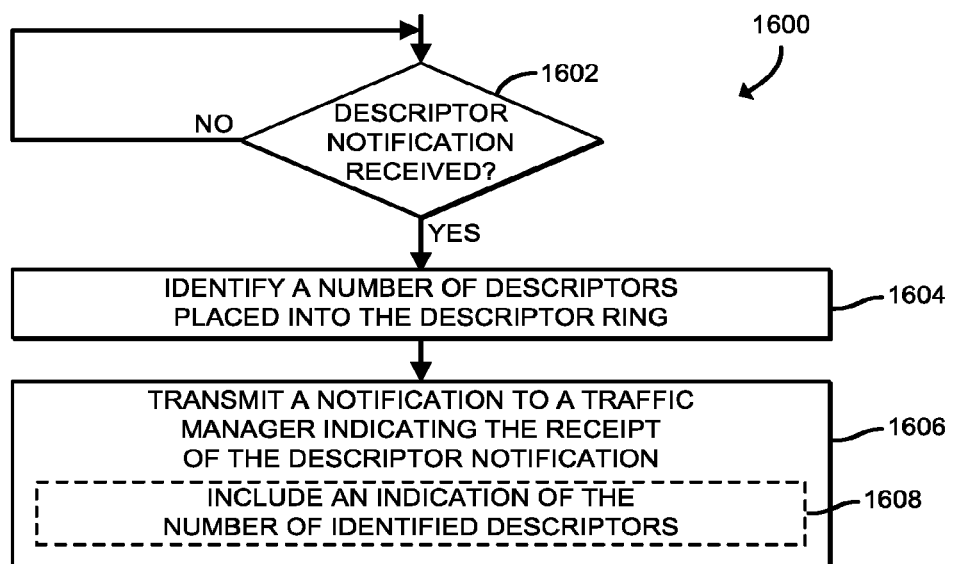
FIG. 16 is a simplified flow diagram of at least one embodiment of a method for notifying a traffic manager of the NIC of FIG. 13 receipt of descriptor(s) that may be performed by the flexible host interface of FIGS. 13 and 14.

Referring now to FIG. 16, in use, the compute device 1200, or more particularly a host interface of the NIC 1214 (e.g., the flexible host interface 1314 of the NIC 1214 of FIGS. 13 and 14), may execute a method 1600 for notifying a traffic manager of the NIC (e.g., the traffic manager 1312 of the NIC 1214 of FIG. 13) of the receipt of one or more descriptors from a host CPU of the compute device 1200 (e.g., one of the host CPUs 1328 of FIG. 13). The method 1600 begins in block 1602, in which the flexible host interface 1314 determines whether a descriptor notification has been received (e.g., as generated in block 1508 of the method 1500 of FIG. 5). If so, the method 1600 advances to block 1604, in which the flexible host interface 1314 identifies a number of descriptors placed into the descriptor ring.

In block 1606, the flexible host interface 1314 transmits a notification to a traffic manager indicating the receipt of the descriptor notification which is usable by the traffic manager to manage whether descriptors are presently available for processing in the descriptor ring. In some embodiments, in block 1608, the flexible host interface 1314 may include an indication of the number of descriptors placed into the descriptor ring. It should be appreciated that, in some embodiments, the traffic manager 1312 does not regulate the transmission traffic. Accordingly, in such embodiments, the method 1600 may not be performed.

Figure 17:
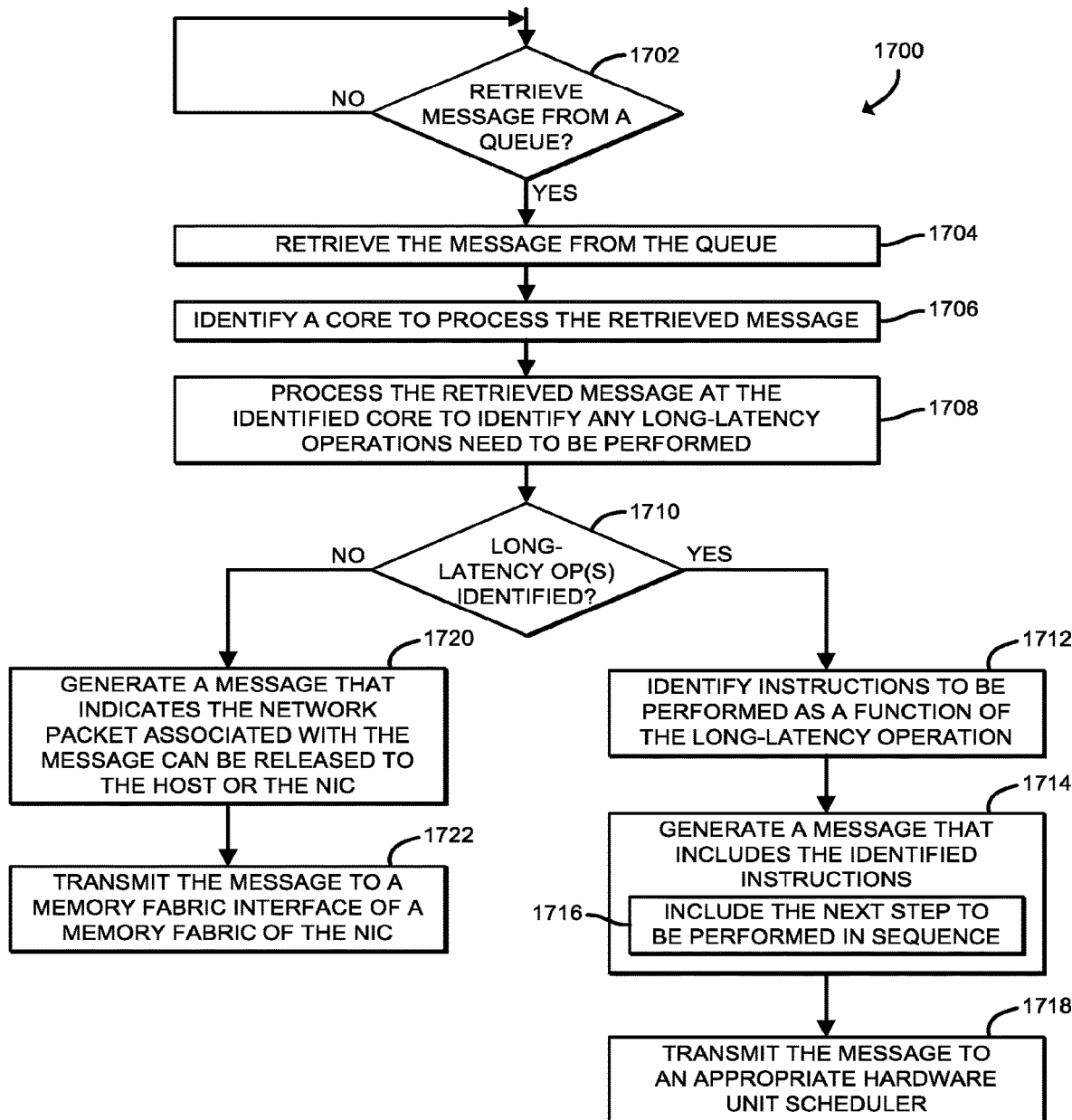
FIG. 17 is a simplified flow diagram of at least one embodiment of a method for processing messages that may be performed by a symmetric multi-processing array of the flexible host interface of FIG. 14.

Referring now to FIG. 17, in use, the compute device 1200, or more particularly an SMP array of a flexible host interface of the NIC 1214 (the SMP array 1422 of the illustrative flexible host interface 1314 of FIG. 14), may execute a method 1700 for processing messages received at the SMP array. The method 1700 begins in block 1702, in which the SMP array 1422 determines whether to retrieve a message in a message queue (e.g., one of the event message queues 1414, the DMA queues 1432, the descriptor queues 1442, the offload queues 1450, etc.). As described previously, the queued messages may be formatted based on various different protocols. As such, for example, the event logic units 1404 are configured to build messages having data structures based on an associated protocol which is readable by the SMP array 1422. Accordingly, it should be appreciated that the SMP array 1422 can dynamically support processing of multiple protocols, such as may be based on assignment at initialization (e.g., of a virtual function which has been mapped to a particular message queue).

If the SMP array 1422 determines that a message is to be retrieved, the method 1700 advances to block 1704, in which the SMP array 1422 retrieves the message from the appropriate message queue. In block 1706, the SMP array 1422 identifies a core (e.g., one of the processor cores 1424 of FIG. 14) to process the retrieved message. In block 1708, the SMP array 1422, or more particularly the identified core of the SMP array 1422, processes the retrieved message to identify whether any long-latency operations (e.g., a DMA fetch operation) need to be performed. In block 1710, the SMP array 1422 determines whether any long-latency operations were identified. If so, the method 1700 branches to block 1712, in which the SMP array 1422 identifies instructions to be performed as a function of the identified long-latency operation. For example, if the long-latency operation has been identified as a DMA operation, the instructions may include a fetch instruction with any information necessary to perform the DMA fetch operation. In block 1714, the SMP array 1422 generates a message which includes the identified instructions. In block 1716, the SMP array 1422 includes the next step to be performed into the message (e.g., an operation to be performed subsequent to the long-latency operation having completed). In block 1718, the SMP array 1422 transmits the generated message to an appropriate hardware unit scheduler (e.g., the DMA controller 1438 of the illustrative DMA engine 1434 of FIG. 14) to perform the long-latency operation.

Referring back to block 1710, if the SMP array 1422 determines that no long-latency operations were identified, the method 1700 branches to block 1720. In block 1720, the SMP array 1422 generates a message (i.e., a release message) which indicates the network packet associated with the received message can be released to the host (e.g., the network packet was received by the NIC 1214) or the NIC 1214 (e.g., the network packet is being transmitted from the NIC 1214). In block 1722, the SMP array 1422 transmits the message to a memory fabric interface of a memory fabric (e.g., the memory fabric interface 1304 of the memory fabric 1306) of the NIC 1214 to release the network packet.

Figure 18A:
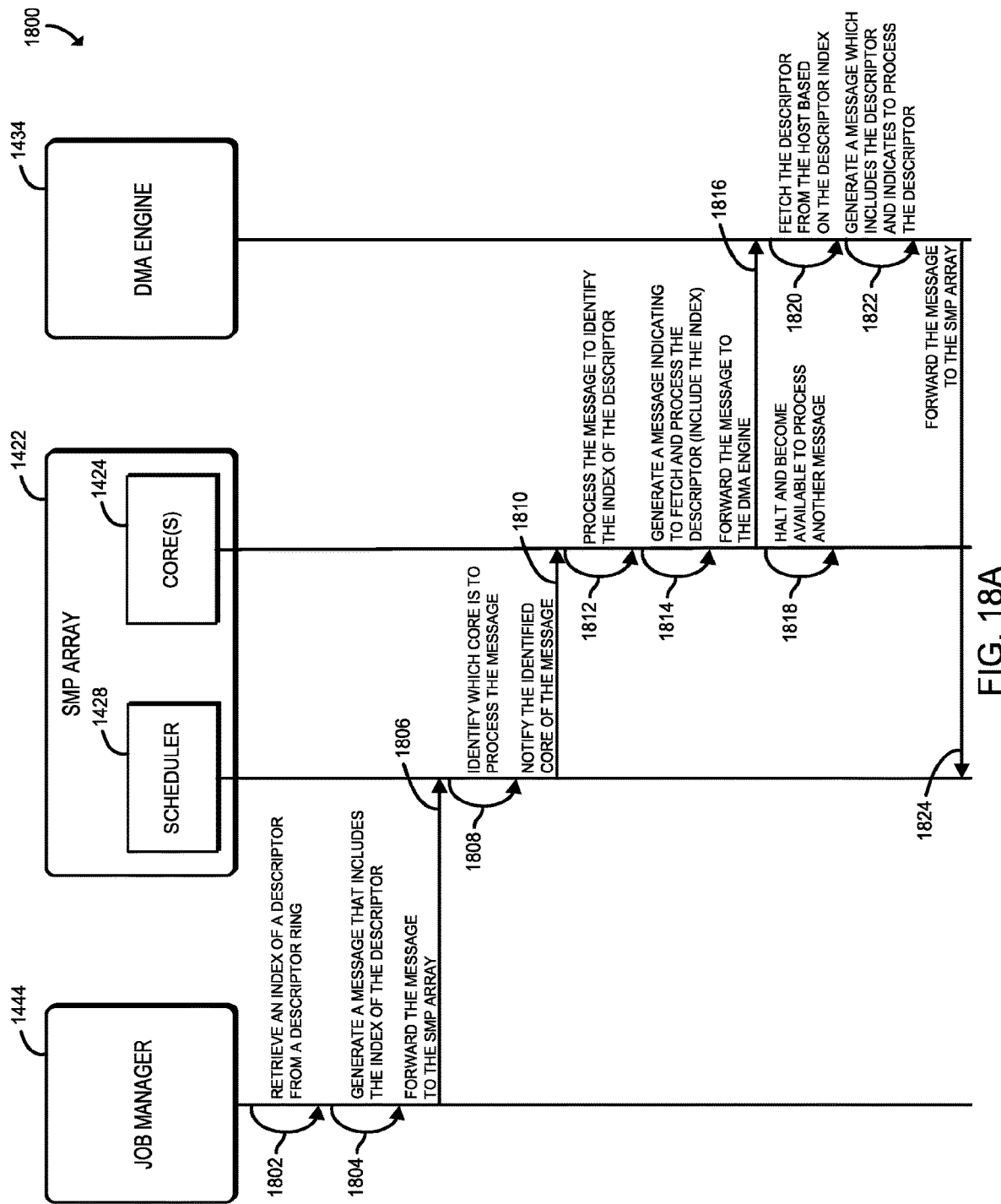
FIGS. 18A and 18B are a simplified communication flow diagram of at least one embodiment for processing network packets that may be performed by the flexible host interface of FIG. 14.
Figure 18B:
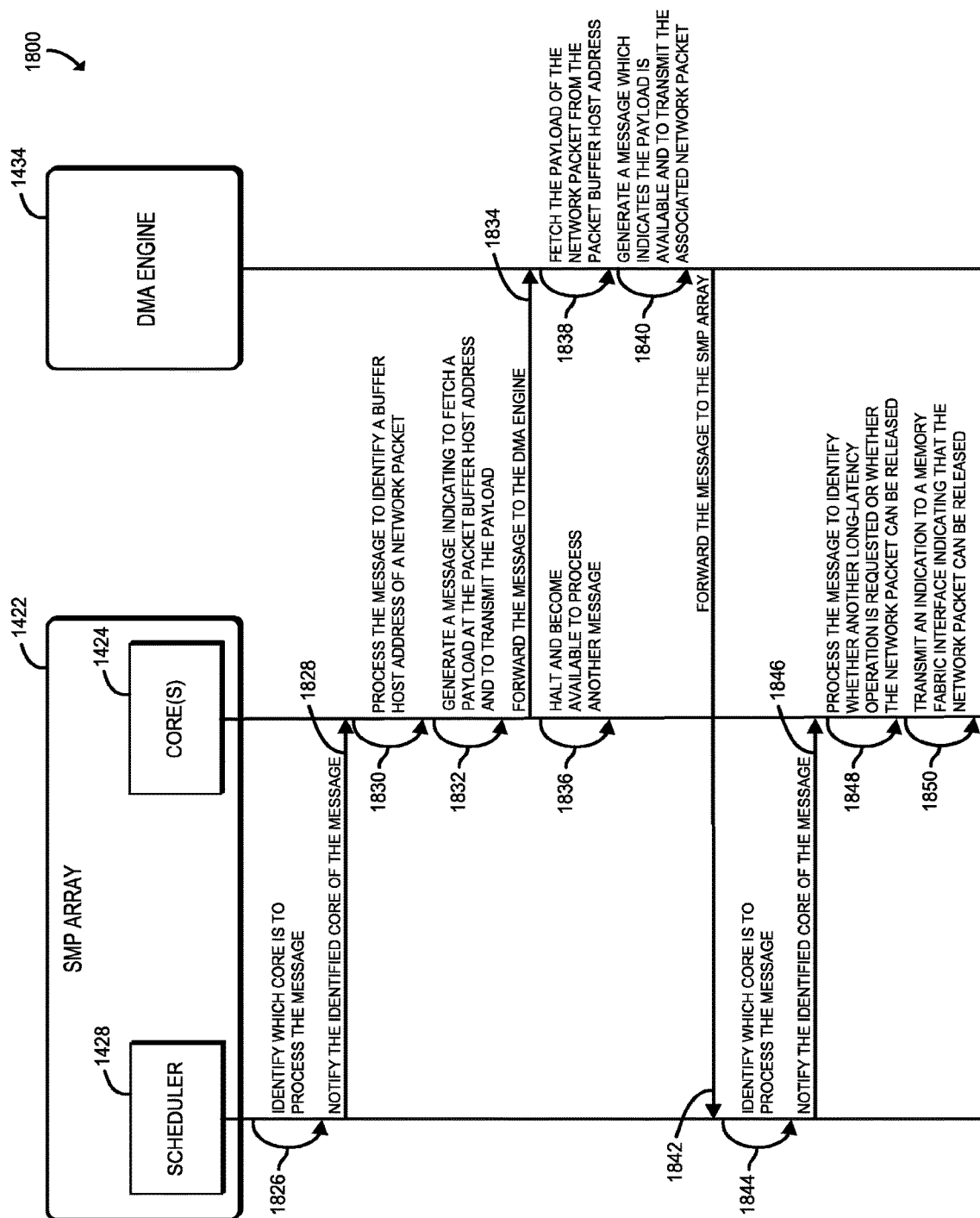

Referring now to FIGS. 18A and 18B, an embodiment of a communication flow 1800 for processing network packets at the flexible host interface 1314 includes the job manager 1444, the SMP array 1422, and the DMA engine 1434 of the illustrative flexible host interface 1314 of FIG. 14. The illustrative communication flow 1800 includes a number of data flows, some of which may be executed separately or together, depending on the embodiment. In data flow 1802, the job manager 1444 retrieves an index of a descriptor from a descriptor ring, which corresponds to the index of the descriptor in an array of descriptors (e.g., stored in a data table in cache memory accessible by the host CPU 1328). It should be appreciated that prior to the execution of the communication flow 1800, the index of the descriptor was placed in the descriptor ring by a host CPUs of the compute device 1200 (e.g., one of the host CPUs 1328 of FIG. 13), an example of which is described in the method 1500 of FIG. 15 above. It should be further appreciated that, in some embodiments, the job manager 1444 may have to receive permission from a traffic manager of the NIC 1214 (e.g., the traffic manager 1312 of the illustrative NIC 1214 of FIG. 13), which is described below in the method 1900 of FIG. 19.

As described previously, descriptors are associated with at least a portion of a network packet (e.g., the entire network packet, a header of the network packet, a footer of the network packet, or at least a portion of a payload of the network packet). As also described previously, the descriptor additionally includes descriptor information which is usable to identify a storage location of the associated portion of the network packet, as well as a network protocol associated with a network packet and/or additional information which indicates or is otherwise usable to identify a type of data associated with the network packet, a packet flow of the network packet, etc., such that the descriptor information may be used to identify one or more operations to be performed on the corresponding portion of the network packet.

In data flow 1804, the job manager 1444 generates a message that includes the retrieved index of the descriptor. In data flow 1806, the job manager 1444 forwards the message to the SMP array 1422. While not illustratively shown, it should be appreciated that the message is queued in a descriptor queue (e.g., one of the descriptor queues 1442 managed by the descriptor queue manager 1440), which can be retrieved by the SMP array 1422. In data flow 1808, the scheduler 1428 of the SMP array 1422 identifies which processor core of a pool of processor cores 1424 of the SMP array 1422 is to process the message. As described previously, the processor cores 1424 may be treated as one pool of processors, each usable on a first available basis to process a message. Alternatively, as also described previously, the processor cores 1424 may be partitioned into groups such that each group is configured to process a particular type, or set of types, of messages.

In data flow 1810, the scheduler 1428 notifies the identified core of the arrival of the message to be processed. In data flow 1812, the identified one of the processor cores 1424 processes the message to identify the location of the descriptor based on the index of the descriptor included in the message. In data flow 1814, the identified processor core 1424 generates another message which indicates to fetch and process the descriptor. It should be appreciated that the fetch operation is an identified long-latency operation and the descriptor processing operation is to be performed by the SMP array 1422, or more particularly be one of the processor cores 1424 of the SMP array 1422, upon completion of the identified long-latency operation (i.e., the fetch operation). In data flow 1816, the identified processor core 1424 forwards the message to the DMA engine 1434 to perform the fetch operation. While not illustratively shown, it should be appreciated that the message is queued in a DMA queue (e.g., one of the DMA queues 1432 managed by the DMA queue manager 1430), which can be retrieved by the DMA engine 1434. In data flow 1818, the identified processor core 1424 halts and becomes available to process another message.

In data flow 1820, the DMA engine 1434, upon processing of the message receive in data flow 1816 and determining a descriptor fetch operation is being requested (e.g., such as may be determined by a DMA core 1436 of the illustrative DMA engine 1434 of FIG. 14 as directed by the DMA controller 1438 of the DMA engine 1434), fetches the descriptor from the host (e.g., from a table of descriptors stored by one of the host CPUs 1328) based on the index of the descriptor included in the message. In data flow 1822, in response to the fetch operation having completed (i.e., the descriptor having been fetched and stored in a memory buffer accessible by the SMP array 1422), the DMA engine 1434 generates a message which includes the descriptor and indicates to process the descriptor. In data flow 1824, the DMA engine 1434 forwards the message to the SMP array 1422. As described previously, such messages are queued in a DMA queue (e.g., one of the DMA queues 1432 managed by the DMA queue manager 1430), which can be retrieved by the SMP array 1422.

In data flow 1826, as shown in FIG. 18B, the scheduler 1428 of the SMP array 1422 identifies which process core of the pool of processor cores 1424 is to process the message. In data flow 1828, the scheduler 1428 notifies the identified processor core 1424 of the received message to be processed. In data flow 1830, the identified processor core 1424 processes the message to identify a buffer host address of a network packet. As described previously, it should be appreciated that the descriptor may alternatively correspond to a portion of the network packet (e.g., a header, a footer, a portion of payload, etc.). In data flow 1832, the identified processor core 1424 generates a message indicating a payload of the network packet is to be fetched at the packet buffer host address in host memory (e.g., the memory 1206 of the compute engine 1202 of FIG. 12). Additionally, the identified processor core 1424 includes an indication in the message that indicates the operation to be performed subsequent to the fetch having completed is to transmit the fetched payload (e.g., on the wire to another compute device). In other words, there are no more long-latency operations to be performed on the network packet.

In data flow 1834, the identified processor core 1424 forwards the message to the DMA engine 1434 to perform the fetch operation. While not illustratively shown, as noted previously, it should be appreciated that the message is queued in one of the DMA queues 1432, which allows for the message to be retrieved by the DMA engine 1434 at its discretion. In data flow 1836, the identified processor core 1424 halts and becomes available to process another message.

In data flow 1838, the DMA engine 1434 fetches the payload of the network packet from the packet buffer host address (i.e., in host memory). In data flow 1840, upon the fetch operation having completed (i.e., the payload has been fetched from host memory and stored in a temporary buffer, such as the SRAM 1322 or the DDR SDRAM 1326), the DMA engine 1434 generates a message which indicates the payload is available for transmission and to transmit the associated network packet. In data flow 1842, the DMA engine 1432 forwards the message to the SMP array 1422. As noted previously, while not illustratively shown, it should be appreciated that the message is queued in one of the descriptor queues 1442, which allows for the message to be retrieved by the SMP array 1422 at its discretion.

In data flow 1844, the scheduler 1428 of the SMP array 1422 identifies which process core of the pool of processor cores 1424 is to process the message. In data flow 1846, the scheduler 1428 notifies the identified processor core 1424 of the received message to be processed. In data flow 1848, the identified processor core 1424 processes the message to identify whether another long-latency operation has been request or whether the network packet can be released. It should be appreciated that for the purposes of this illustrative example, the message generated in data flow 1840 indicated that the network packet is to be transmitted. Accordingly, in data flow 1850, the identified processor core 1424 transmits an indication to a memory fabric interface (e.g., the memory fabric interface 1304 of the memory fabric 1306) indicating that the network packet can be released to the memory fabric for transmission therefrom to another compute device. It should be appreciated that, while not illustratively shown, a similar set of data flows may be performed of a communication flow for processing a network packet in response to having received the network packet at the NIC 1214 from another compute device, culminating in the network packet being released from the memory fabric to an applicable host memory after the appropriate long-latency operations have been identified and performed.

As described previously, the job manager 1444 may be configured to initiate the processing of outbound network packets based on certain criteria, such as whether a processor core of the job manager 1444 (e.g., one of the processor cores 1446 of the illustrative job manager 1444 of FIG. 14) is available, a number of messages presently enqueuer in a descriptor queue (e.g., one of the descriptor queues 1442 of FIG. 14) relative to a capacity of the descriptor queue (i.e., a fullness level), etc. In some embodiments, the job manager 1444 may only allow one descriptor from a given queue to be in-flight at any point in time (i.e., a single-queue line rate). As also described previously, in some embodiments, the job manager 1444 may rely on the traffic manager 1312 to dictate how many network packets are to be in process for transit at a given point in time.

Figure 19:
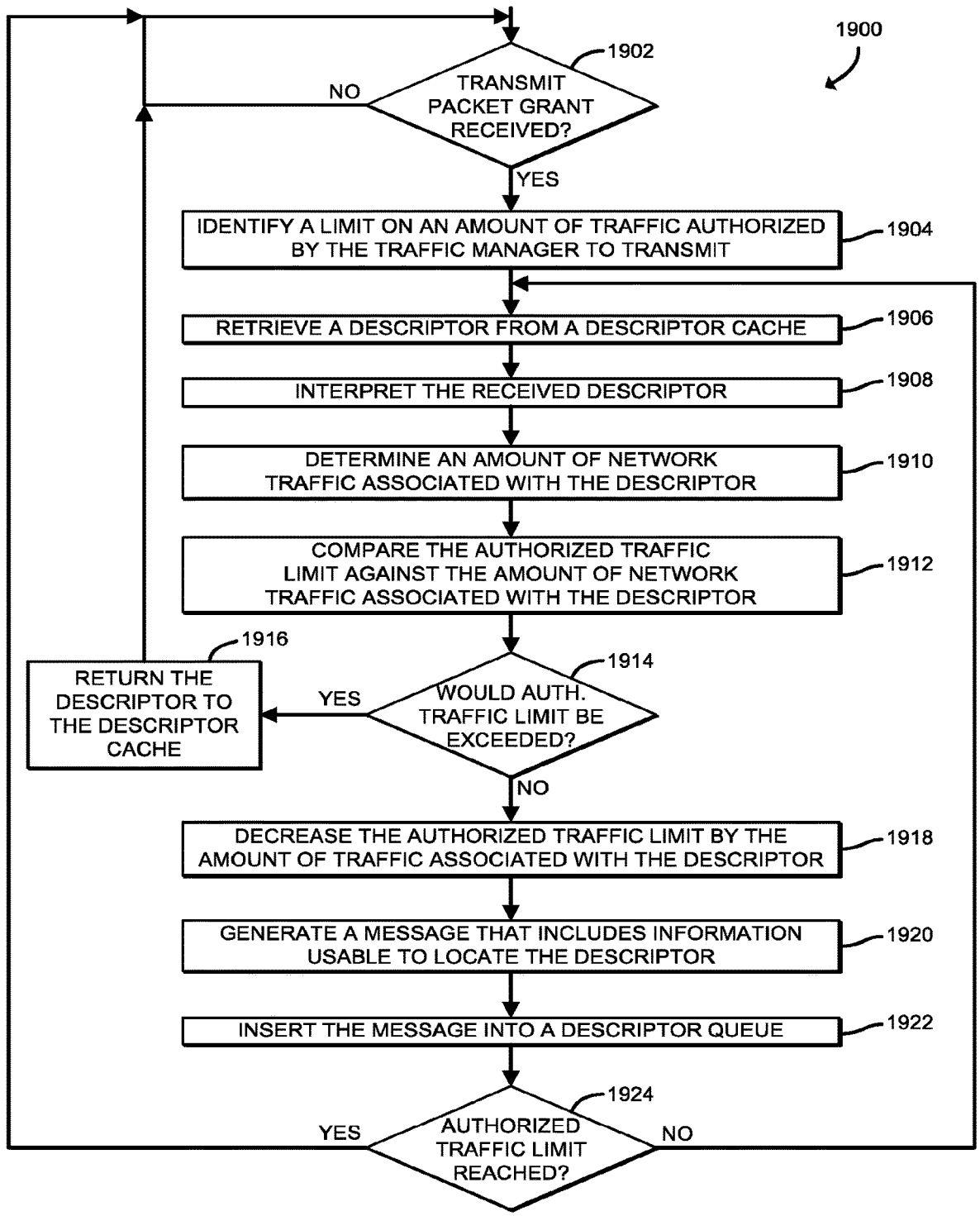
FIG. 19 is a simplified communication flow diagram of at least one embodiment for throttling the processing of outbound network packets that may be performed by a job manager of FIG. 14.

Referring now to FIG. 19, in use, the compute device 1200, or more particularly a job manager of a flexible host interface of the NIC 1214 (e.g., the job manager 1444 of the illustrative flexible host interface 1314 of FIG. 14), may execute a method 1900 for throttling the processing of outbound network packets. The method 1900 begins in block 1902, in which the job manager 1444 determines whether a transmit packet grant message has been received from a traffic manager of the NIC 1214 (e.g., the traffic manager 1312 of FIG. 13). If so, the method 1900 advances to block 1904, in which the job manager 1444 identifies a limit on an amount of network traffic authorized by the traffic manager 1312 for transmission from the NIC 1214 (i.e., an authorized traffic limit). It should be appreciated that he transmit packet grant message may include additional and/or alternative transmit traffic restrictions in other embodiments. For example, the other transmit traffic restrictions may include a restriction that only a certain network packet type, priority, or flow is to be processed at a given point in time.

In block 1906, the job manager 1444 retrieves a descriptor from a descriptor cache (e.g., via a DMA request to the DMA engine 1434). In block 1908, upon retrieval of the descriptor, the job manager 1444 interprets the received descriptor. In block 1910, the job manager 1444 determines an amount of network traffic associated with the descriptor. The amount of network traffic may be any value usable to identify the size of the network traffic to be processed that is associated with the descriptor, such as a size relative to an entire network packet (e.g., one half of a network packet, an entire network packet, a header, etc.), a number of bits, etc.

In block 1912, the job manager 1444 compares the authorized traffic limit against the determined amount of network traffic associated with the descriptor. In block 1914, the job manager 1444 determines whether the authorized traffic limit would be exceeded as a function of the comparison performed in block 1912. If so, the method 1900 branches to block 1916, in which the job manager 1444 returns the descriptor to the descriptor cache; otherwise, the method branches to block 1918. In block 1918, the job manager 1444 decreases the authorized traffic limit by the amount of network traffic associated with the descriptor. In block 1920, the job manager 1444 generates a message that includes information usable to locate the descriptor, such as an index of the descriptor in the descriptor cache, a temporary buffer location of the descriptor, etc. In block 1922, the job manager 1444 inserts the message into a descriptor queue (e.g., one of the descriptor queues 1442 of FIG. 14). In block 1924, the job manager 1444 determines whether the authorized traffic limit has been reached (i.e., whether the decreased the authorized traffic limit is zero or below a particular minimum threshold). If so, the method 1900 returns to block 1902 to determine whether another transmit packet grant message has been received; otherwise, the method 1900 returns to block 1906 to retrieve another descriptor from a description cache.

EXAMPLES

Illustrative examples of the technologies disclosed herein are provided below. An embodiment of the technologies may include any one or more, and any combination of, the examples described below.

Example 1 includes a compute device for processing network packets, the compute device comprising a compute engine having one or more processors and a memory; and a network interface controller (NIC) having a host interface, wherein the NIC is to retrieve, by a symmetric multi-purpose (SMP) array of the host interface, a message from a message queue of the host interface; process, by a processor core of a plurality of processor cores of the SMP array, the message to identify a long-latency operation to be performed on at least a portion of a network packet associated with the message; generate, by the processor core and in response to having identified the long-latency operation to be performed, another message which includes an indication of the long-latency operation to be performed and a next step to be performed upon completion of the long-latency operation; and transmit, by the processor core, the other message to a corresponding hardware unit scheduler of the host interface as a function of the long-latency operation to be performed.

Example 2 includes the subject matter of Example 1, and wherein the NIC is further to generate, by the processor core and in response to having identified that no long-latency operations are to be performed based on the processing of the message, a release message which indicates the network packet can be released to one of the one or more processors or a network interface of the NIC; and transmit, by the processor core, the release message to a memory fabric interface of a memory fabric of the NIC.

Example 3 includes the subject matter of any of Examples 1 and 2, and wherein the NIC is further to retrieve, by a job manager of the host interface, an index of a descriptor in a descriptor table stored by a processor of the one or more processors at a location in the memory, wherein the descriptor includes information corresponding to a network packet; forward, by the job manager, a first message to the symmetric multi-purpose (SMP) array of the host interface, wherein the first message includes the index of the descriptor; process, by a first processor core of the plurality of processor cores of the SMP array, the first message to identify the index of the descriptor; generate, by the first processor core, a second message that indicates to perform a fetch operation to retrieve the descriptor based on the index of the descriptor and includes an indication that the retrieved descriptor is to be processed upon retrieval; and forward, by the first processor core, the second message to a DMA engine of the host interface.

Example 4 includes the subject matter of any of Examples 1-3, and wherein the NIC is further to process, by the DMA engine, the second message to identify a DMA fetch operation to be performed, wherein the DMA fetch operation to be performed comprises to fetch the descriptor via DMA; perform, by the DMA engine, the identified DMA fetch operation; generate, by the DMA engine, a third message which includes the descriptor retrieved as a result of the DMA fetch operation, wherein the third message includes a location of the descriptor in a buffer memory of the host interface and the indication that the retrieved descriptor is to be processed; and forward, by the DMA engine, the third message to the SMP array.

Example 5 includes the subject matter of any of Examples 1-4, and wherein to forward the first message to the SMP array comprises to enqueue the message in a descriptor queue accessible by the SMP array.

Example 6 includes the subject matter of any of Examples 1-5, and wherein to retrieve the index of the descriptor comprises to retrieve the index of the descriptor from a descriptor ring stored in a cache memory of the compute engine.

Example 7 includes the subject matter of any of Examples 1-6, and wherein the NIC is further to receive, by the job manager, an authorized traffic limit from a traffic manager of the NIC, wherein the authorized traffic limit indicates an amount of network traffic the job manager is allowed to process upon receipt; retrieve, by the job manager, a next descriptor from the descriptor table; interpret, by the job manager, the next descriptor to determine the amount of network traffic associated with the next descriptor; determine, by the job manager, whether the authorized traffic limit would be exceeded if the network traffic associated with the next descriptor were to be processed as a function of the amount of network traffic associated with the next descriptor and the authorized traffic limit; and return, by the job manager and subsequent to having determined that the authorized traffic limit would be exceeded, the descriptor to the descriptor table.

Example 8 includes the subject matter of any of Examples 1-7, and wherein the NIC is further to decrease, by the job manager and subsequent to having determined that the authorized traffic limit would not be exceeded, the authorized traffic limit by the amount of network traffic associated with the next descriptor; generate, by the job manager, a fourth message that includes information usable to locate the descriptor; and insert, by the job manager, the message into a descriptor queue accessible by the SMP array.

Example 9 includes the subject matter of any of Examples 1-8, and wherein to retrieve the next descriptor from the descriptor table comprises to perform another DMA fetch operation to return the next descriptor.

Example 10 includes the subject matter of any of Examples 1-9, and wherein to retrieve the next descriptor comprises to retrieve the next descriptor associated with one of a header of the network packet, at least a portion of a payload of the network packet, or the header and the payload of the network packet.

Example 11 includes the subject matter of any of Examples 1-10, and wherein to identify the long-latency operation comprises to identify a direct memory access (DMA) fetch operation.

Example 12 includes the subject matter of any of Examples 1-11, and wherein the NIC is further to receive, by an event logic unit of the host interface, an event notification; and build, by the event logic unit, a data structure as a function of a network protocol associated with the event notification, wherein the data structure includes information about the event notification usable by at least one of the plurality of processor cores of the SMP array to process the event notification.

Example 13 includes the subject matter of any of Examples 1-12, and wherein to receive the event notification comprises to receive the event notification which indicates one of a signaling event, a memory-mapped input/output event, or a host fabric interface event.

Example 14 includes a method for processing network packets, the method comprising retrieving, by a symmetric multi-purpose (SMP) array of a host interface of a network interface controller (NIC) of a compute device, a message from a message queue of the host interface; processing, by a processor core of a plurality of processor cores of the SMP array, the message to identify a long-latency operation to be performed on at least a portion of a network packet associated with the message; generating, by the processor core and in response to having identified the long-latency operation to be performed, another message which includes an indication of the long-latency operation to be performed and a next step to be performed upon completion of the long-latency operation; and transmitting, by the processor core, the other message to a corresponding hardware unit scheduler of the host interface as a function of the long-latency operation to be performed.

Example 15 includes the subject matter of Example 14, and further including generating, by the processor core and in response to having identified that no long-latency operations are to be performed based on the processing of the message, a release message which indicates the network packet can be released to one of one or more processors of a compute engine of the compute device or a network interface of the NIC; and transmitting, by the processor core, the release message to a memory fabric interface of a memory fabric of the NIC.

Example 16 includes the subject matter of any of Examples 14 and 15, and further including retrieving, by a job manager of the host interface, an index of a descriptor in a descriptor table stored by a processor of one or more processors of a compute engine of the compute device at a location in a memory of the compute engine, wherein the descriptor includes information corresponding to a network packet; forwarding, by the job manager, a first message to the symmetric multi-purpose (SMP) array of the host interface, wherein the first message includes the index of the descriptor; processing, by a first processor core of the plurality of processor cores of the SMP array, the first message to identify the index of the descriptor; generating, by the first processor core, a second message that indicates to perform a fetch operation to retrieve the descriptor based on the index of the descriptor and includes an indication that the retrieved descriptor is to be processed upon retrieval; and forwarding, by the first processor core, the second message to a DMA engine of the host interface.

Example 17 includes the subject matter of any of Examples 14-16, and further including processing, by the DMA engine, the second message to identify a DMA fetch operation to be performed, wherein the DMA fetch operation to be performed comprises to fetch the descriptor via DMA; performing, by the DMA engine, the identified DMA fetch operation; generating, by the DMA engine, a third message which includes the descriptor retrieved as a result of the DMA fetch operation, wherein the third message includes a location of the descriptor in a buffer memory of the host interface and the indication that the retrieved descriptor is to be processed; and forwarding, by the DMA engine, the third message to the SMP array.

Example 18 includes the subject matter of any of Examples 14-17, and wherein forwarding the first message to the SMP array comprises enqueuing the message in a descriptor queue accessible by the SMP array.

Example 19 includes the subject matter of any of Examples 14-18, and wherein retrieving the index of the descriptor comprises retrieving the index of the descriptor from a descriptor ring stored in a cache memory of the compute engine.

Example 20 includes the subject matter of any of Examples 14-19, and further including receiving, by the job manager, an authorized traffic limit from a traffic manager of the NIC, wherein the authorized traffic limit indicates an amount of network traffic the job manager is allowed to process upon receipt; retrieving, by the job manager, a next descriptor from the descriptor table; interpreting, by the job manager, the next descriptor to determine the amount of network traffic associated with the next descriptor; determining, by the job manager, whether the authorized traffic limit would be exceeded if the network traffic associated with the next descriptor were to be processed as a function of the amount of network traffic associated with the next descriptor and the authorized traffic limit; and returning, by the job manager and subsequent to having determined that the authorized traffic limit would be exceeded, the descriptor to the descriptor table.

Example 21 includes the subject matter of any of Examples 14-20, and further including decreasing, by the job manager and subsequent to having determined that the authorized traffic limit would not be exceeded, the authorized traffic limit by the amount of network traffic associated with the next descriptor; generating, by the job manager, a fourth message that includes information usable to locate the descriptor; and inserting, by the job manager, the message into a descriptor queue accessible by the SMP array.

Example 22 includes the subject matter of any of Examples 14-21, and wherein retrieving the next descriptor from the descriptor table comprises performing another DMA fetch operation to return the next descriptor.

Example 23 includes the subject matter of any of Examples 14-22, and wherein retrieving the next descriptor comprises retrieving the next descriptor associated with one of a header of the network packet, at least a portion of a payload of the network packet, or the header and the payload of the network packet.

Example 24 includes the subject matter of any of Examples 14-23, and wherein identifying the long-latency operation comprises identifying a direct memory access (DMA) fetch operation.

Example 25 includes the subject matter of any of Examples 14-24, and further including receiving, by an event logic unit of the host interface, an event notification; and building, by the event logic unit, a data structure as a function of a network protocol associated with the event notification, wherein the data structure includes information about the event notification usable by at least one of the plurality of processor cores of the SMP array to process the event notification.

Example 26 includes the subject matter of any of Examples 14-25, and wherein receiving the event notification comprises receiving the event notification which indicates one of a signaling event, a memory-mapped input/output event, or a host fabric interface event.

Example 27 includes one or more machine-readable storage media comprising a plurality of instructions stored thereon that, in response to being executed, cause a compute device to perform the method of any of Examples 14-26.

Example 28 includes a compute device for improving throughput in a network, the compute device comprising one or more processors; one or more memory devices having stored therein a plurality of instructions that, when executed by the one or more processors, cause the compute device to perform the method of any of Examples 14-26.

Example 29 includes a compute device for processing network packets, the compute device comprising host interface circuitry of a network interface controller (NIC) to retrieve, by a symmetric multi-purpose (SMP) array of the host interface circuitry, a message from a message queue of the host interface circuitry; process, by a processor core of a plurality of processor cores of the SMP array, the message to identify a long-latency operation to be performed on at least a portion of a network packet associated with the message; generate, by the processor core and in response to having identified the long-latency operation to be performed, another message which includes an indication of the long-latency operation to be performed and a next step to be performed upon completion of the long-latency operation; and transmit, by the processor core, the other message to a corresponding hardware unit scheduler of the host interface circuitry as a function of the long-latency operation to be performed.

Example 30 includes the subject matter of Example 29, and wherein the host interface circuitry is further to generate, by the processor core and in response to having identified that no long-latency operations are to be performed based on the processing of the message, a release message which indicates the network packet can be released to one of the one or more processors or a network interface of the NIC; and transmit, by the processor core, the release message to a memory fabric interface of a memory fabric of the NIC.

Example 31 includes the subject matter of any of Examples 29 and 30, and wherein the host interface circuitry is further to retrieve, by a job manager of the host interface circuitry, an index of a descriptor in a descriptor table stored by a processor of the one or more processors at a location in the memory, wherein the descriptor includes information corresponding to a network packet; forward, by the job manager, a first message to the symmetric multi-purpose (SMP) array of the host interface circuitry, wherein the first message includes the index of the descriptor; process, by a first processor core of the plurality of processor cores of the SMP array, the first message to identify the index of the descriptor; generate, by the first processor core, a second message that indicates to perform a fetch operation to retrieve the descriptor based on the index of the descriptor and includes an indication that the retrieved descriptor is to be processed upon retrieval; and forward, by the first processor core, the second message to a DMA engine of the host interface circuitry.

Example 32 includes the subject matter of any of Examples 29-31, and wherein the host interface circuitry is further to process, by the DMA engine, the second message to identify a DMA fetch operation to be performed, wherein the DMA fetch operation to be performed comprises to fetch the descriptor via DMA; perform, by the DMA engine, the identified DMA fetch operation; generate, by the DMA engine, a third message which includes the descriptor retrieved as a result of the DMA fetch operation, wherein the third message includes a location of the descriptor in a buffer memory of the host interface circuitry and the indication that the retrieved descriptor is to be processed; and forward, by the DMA engine, the third message to the SMP array.

Example 33 includes the subject matter of any of Examples 29-32, and wherein to forward the first message to the SMP array comprises to enqueue the message in a descriptor queue accessible by the SMP array.

Example 34 includes the subject matter of any of Examples 29-33, and wherein to retrieve the index of the descriptor comprises to retrieve the index of the descriptor from a descriptor ring stored in a cache memory of the compute engine.

Example 35 includes the subject matter of any of Examples 29-34, and wherein the host interface circuitry is further to receive, by the job manager, an authorized traffic limit from a traffic manager of the NIC, wherein the authorized traffic limit indicates an amount of network traffic the job manager is allowed to process upon receipt; retrieve, by the job manager, a next descriptor from the descriptor table; interpret, by the job manager, the next descriptor to determine the amount of network traffic associated with the next descriptor; determine, by the job manager, whether the authorized traffic limit would be exceeded if the network traffic associated with the next descriptor were to be processed as a function of the amount of network traffic associated with the next descriptor and the authorized traffic limit; and return, by the job manager and subsequent to having determined that the authorized traffic limit would be exceeded, the descriptor to the descriptor table.

Example 36 includes the subject matter of any of Examples 29-35, and wherein the host interface circuitry is further to decrease, by the job manager and subsequent to having determined that the authorized traffic limit would not be exceeded, the authorized traffic limit by the amount of network traffic associated with the next descriptor; generate, by the job manager, a fourth message that includes information usable to locate the descriptor; and insert, by the job manager, the message into a descriptor queue accessible by the SMP array.

Example 37 includes the subject matter of any of Examples 29-36, and wherein to retrieve the next descriptor from the descriptor table comprises to perform another DMA fetch operation to return the next descriptor.

Example 38 includes the subject matter of any of Examples 29-37, and wherein to retrieve the next descriptor comprises to retrieve the next descriptor associated with one of a header of the network packet, at least a portion of a payload of the network packet, or the header and the payload of the network packet.

Example 39 includes the subject matter of any of Examples 29-38, and wherein to identify the long-latency operation comprises to identify a direct memory access (DMA) fetch operation.

Example 40 includes the subject matter of any of Examples 29-39, and wherein the host interface circuitry is further to receive, by an event logic unit of the host interface circuitry, an event notification; and build, by the event logic unit, a data structure as a function of a network protocol associated with the event notification, wherein the data structure includes information about the event notification usable by at least one of the plurality of processor cores of the SMP array to process the event notification.

Example 41 includes the subject matter of any of Examples 29-40, and wherein to receive the event notification comprises to receive the event notification which indicates one of a signaling event, a memory-mapped input/output event, or a host fabric interface event.

Example 42 includes a compute device for processing network packets, the compute device comprising means for retrieving, by a symmetric multi-purpose (SMP) array of a host interface of a network interface controller (NIC) of a compute device, a message from a message queue of the host interface; means for processing, by a processor core of a plurality of processor cores of the SMP array, the message to identify a long-latency operation to be performed on at least a portion of a network packet associated with the message; means for generating, by the processor core and in response to having identified the long-latency operation to be performed, another message which includes an indication of the long-latency operation to be performed and a next step to be performed upon completion of the long-latency operation; and means for transmitting, by the processor core, the other message to a corresponding hardware unit scheduler of the host interface as a function of the long-latency operation to be performed.

Example 43 includes the subject matter of Example 42, and further including means for generating, by the processor core and in response to having identified that no long-latency operations are to be performed based on the processing of the message, a release message which indicates the network packet can be released to one of one or more processors of a compute engine of the compute device or a network interface of the NIC; and means for transmitting, by the processor core, the release message to a memory fabric interface of a memory fabric of the NIC.

Example 44 includes the subject matter of any of Examples 42 and 43, and further including means for retrieving, by a job manager of the host interface, an index of a descriptor in a descriptor table stored by a processor of one or more processors of a compute engine of the compute device at a location in a memory of the compute engine, wherein the descriptor includes information corresponding to a network packet; means for forwarding, by the job manager, a first message to the symmetric multi-purpose (SMP) array of the host interface, wherein the first message includes the index of the descriptor; means for processing, by a first processor core of the plurality of processor cores of the SMP array, the first message to identify the index of the descriptor; means for generating, by the first processor core, a second message that indicates to perform a fetch operation to retrieve the descriptor based on the index of the descriptor and includes an indication that the retrieved descriptor is to be processed upon retrieval; and means for forwarding, by the first processor core, the second message to a DMA engine of the host interface.

Example 45 includes the subject matter of any of Examples 42-44, and further including means for processing, by the DMA engine, the second message to identify a DMA fetch operation to be performed, wherein the DMA fetch operation to be performed comprises to fetch the descriptor via DMA; means for performing, by the DMA engine, the identified DMA fetch operation; means for generating, by the DMA engine, a third message which includes the descriptor retrieved as a result of the DMA fetch operation, wherein the third message includes a location of the descriptor in a buffer memory of the host interface and the indication that the retrieved descriptor is to be processed; and means for forwarding, by the DMA engine, the third message to the SMP array.

Example 46 includes the subject matter of any of Examples 42-45, and wherein the means for forwarding the first message to the SMP array comprises means for enqueuing the message in a descriptor queue accessible by the SMP array.

Example 47 includes the subject matter of any of Examples 42-46, and wherein the means for retrieving the index of the descriptor comprises means for retrieving the index of the descriptor from a descriptor ring stored in a cache memory of the compute engine.

Example 48 includes the subject matter of any of Examples 42-47, and further including means for receiving, by the job manager, an authorized traffic limit from a traffic manager of the NIC, wherein the authorized traffic limit indicates an amount of network traffic the job manager is allowed to process upon receipt; means for retrieving, by the job manager, a next descriptor from the descriptor table; means for interpreting, by the job manager, the next descriptor to determine the amount of network traffic associated with the next descriptor; means for determining, by the job manager, whether the authorized traffic limit would be exceeded if the network traffic associated with the next descriptor were to be processed as a function of the amount of network traffic associated with the next descriptor and the authorized traffic limit; and means for returning, by the job manager and subsequent to having determined that the authorized traffic limit would be exceeded, the descriptor to the descriptor table.

Example 49 includes the subject matter of any of Examples 42-48, and further including means for decreasing, by the job manager and subsequent to having determined that the authorized traffic limit would not be exceeded, the authorized traffic limit by the amount of network traffic associated with the next descriptor; means for generating, by the job manager, a fourth message that includes information usable to locate the descriptor; and means for inserting, by the job manager, the message into a descriptor queue accessible by the SMP array.

Example 50 includes the subject matter of any of Examples 42-49, and wherein the means for retrieving the next descriptor from the descriptor table comprises means for performing another DMA fetch operation to return the next descriptor.

Example 51 includes the subject matter of any of Examples 42-50, and wherein the means for retrieving the next descriptor comprises means for retrieving the next descriptor associated with one of a header of the network packet, at least a portion of a payload of the network packet, or the header and the payload of the network packet.

Example 52 includes the subject matter of any of Examples 42-51, and wherein the means for identifying the long-latency operation comprises means for identifying a direct memory access (DMA) fetch operation.

Example 53 includes the subject matter of any of Examples 42-52, and further including means for receiving, by an event logic unit of the host interface, an event notification; and means for building, by the event logic unit, a data structure as a function of a network protocol associated with the event notification, wherein the data structure includes information about the event notification usable by at least one of the plurality of processor cores of the SMP array to process the event notification.

Example 54 includes the subject matter of any of Examples 42-53, and wherein the means for receiving the event notification comprises means for receiving the event notification which indicates one of a signaling event, a memory-mapped input/output event, or a host fabric interface event.

What is claimed is:

1. At least one non-transitory machine-readable storage medium storing instructions for execution by at least one machine that is to be associated with at least one server node, the at least one server node to be associated with distributed data center-associated resources, the distributed data center-associated resources being configurable to comprise virtual resources to be associated with physical compute resources, physical storage resources, and/or physical accelerator resources, the at least one server node comprising network interface controller circuitry that is configured to be used in network communication with at least one network node, the instructions, when executed by the at least one machine, resulting in the at least one machine being configured to enable performance of operations comprising:

managing, based upon quality of service data, machine-learning, and workload-related data, allocation of the distributed data center-associated resources for use in providing at least one software-defined infrastructure (SDI) resource and/or at least one SDI service, the managing of the allocation of the distributed data center-associated resources being configurable to be implemented based upon telemetry data associated with the distributed data center-associated resources;

dynamically reallocating at least certain of the distributed data center-associated resources based upon resource utilization data; and utilizing accelerator circuitry of the network interface controller circuitry in association with implementation of service agreements associated with the providing of the at least one SDI resource and/or the at least one SDI service;

wherein:
the distributed data center-associated resources are comprised, at least in part, in the at least one server node and the at least one network node;
the accelerator circuitry is configurable to implement cryptographic-related operations and network communication-related operations in association with the implementation of the service agreements;
the implementation of the service agreements is configurable to comprise enforcement of quality of service;
the physical compute resources and/or physical accelerator resources are configurable to comprise physical central processing unit circuitry, graphics processing unit circuitry, and/or field programmable gate array (FPGA) circuitry;
at least respective portions of the distributed data center-associated resources are configurable as at least one pool of resources; and
at least some of the distributed data center-associated resources are physically disaggregated from each other.

2. The at least one non-transitory machine-readable storage medium of claim 1, wherein:
the network interface controller circuitry is to be associated with cache memory; and
the cache memory is to store network communication-related data for use in the network communication-related operations.

3. The at least one non-transitory machine-readable storage medium of claim 1, wherein:
the resource utilization data comprises predicted workload resource utilization data.

4. The at least one non-transitory machine-readable storage medium of claim 3, wherein:
the network communication is to be carried out via at least one distributed virtual switch; and
the at least one distributed virtual switch is to be implemented, at least in part, by disaggregated resources.

5. The at least one non-transitory machine-readable storage medium of claim 3, wherein:
the at least one SDI service is related, at least in part, to:
software as a service;
platform as a service; and/or
infrastructure as a service.

6. A method implemented using at least one server node, the at least one server node to be associated with distributed data center-associated resources, the distributed data center-associated resources being configurable to comprise virtual resources to be associated with physical compute resources, physical storage resources, and/or physical accelerator resources, the at least one server node comprising network interface controller circuitry that is configured to be used in network communication with at least one network node, the method comprising:
managing, based upon quality of service data, machine-learning, and workload-related data, allocation of the distributed data center-associated resources for use in providing at least one software-defined infrastructure (SDI) resource and/or at least one SDI service, the managing of the allocation of the distributed data center-associated resources being configurable to be implemented based upon telemetry data associated with the distributed data center-associated resources;
dynamically reallocating at least certain of the distributed data center-associated resources based upon resource utilization data; and
utilizing accelerator circuitry of the network interface controller circuitry in association with implementation of service agreements associated with the providing of the at least one SDI resource and/or the at least one SDI service;
wherein:
the distributed data center-associated resources are comprised, at least in part, in the at least one server node and the at least one network node;
the accelerator circuitry is configurable to implement cryptographic-related operations and network communication-related operations in association with the implementation of the service agreements;
the implementation of the service agreements is configurable to comprise enforcement of quality of service;
the physical compute resources and/or physical accelerator resources are configurable to comprise physical central processing unit circuitry, graphics processing unit circuitry, and/or field programmable gate array (FPGA) circuitry;
at least respective portions of the distributed data center-associated resources are configurable as at least one pool of resources; and
at least some of the distributed data center-associated resources are physically disaggregated from each other.

7. The method of claim 6, wherein:
the network interface controller circuitry is to be associated with cache memory; and
the cache memory is to store network communication-related data for use in the network communication-related operations.

8. The method of claim 6, wherein:
the resource utilization data comprises predicted workload resource utilization data.

9. The method of claim 8, wherein:
the network communication is to be carried out via at least one distributed virtual switch; and the at least one distributed virtual switch is to be implemented, at least in part, by disaggregated resources.

10. The method of claim 8, wherein:
the at least one SDI service is related, at least in part, to:
software as a service;
platform as a service; and/or
infrastructure as a service.

11. At least one server node to be associated with distributed data center-associated resources, the distributed data center-associated resources being configurable to comprise virtual resources to be associated with physical compute resources, physical storage resources, and/or physical accelerator resources, the at least one server node to be used in association with at least one network node, the at least one server node comprising:
network interface controller circuitry to be configured to be used in network communication with the at least one network node; and
processor circuitry to execute instructions, the instructions, when executed by the processor circuitry, resulting in the processor circuitry being configured to enable performance of operations comprising:
managing, based upon quality of service data, machine-learning, and workload-related data, allocation of the distributed data center-associated resources for use in providing at least one software-defined infrastructure (SDI) resource and/or at least one SDI service, the managing of the allocation of the distributed data center-associated resources being configurable to be implemented based upon telemetry data associated with the distributed data center-associated resources;
dynamically reallocating at least certain of the distributed data center-associated resources based upon resource utilization data; and
utilizing accelerator circuitry of the network interface controller circuitry in association with implementation of service agreements associated with the providing of the at least one SDI resource and/or the at least one SDI service;
wherein:
the distributed data center-associated resources are comprised, at least in part, in the at least one server node and the at least one network node;
the accelerator circuitry is configurable to implement cryptographic-related operations and network communication-related operations in association with the implementation of the service agreements;
the implementation of the service agreements is configurable to comprise enforcement of quality of service;
the physical compute resources and/or physical accelerator resources are configurable to comprise physical central processing unit circuitry, graphics processing unit circuitry, and/or field programmable gate array (FPGA) circuitry;
at least respective portions of the distributed data center-associated resources are configurable as at least one pool of resources; and
at least some of the distributed data center-associated resources are physically disaggregated from each other.

12. The at least one server node of claim 11, wherein:
the network interface controller circuitry is to be associated with cache memory; and
the cache memory is to store network communication-related data for use in the network communication-related operations.

13. The at least one server node of claim 11, wherein:
the resource utilization data comprises predicted workload resource utilization data.

14. The at least one server node of claim 13, wherein:
the network communication is to be carried out via at least one distributed virtual switch; and
the at least one distributed virtual switch is to be implemented, at least in part, by disaggregated resources.

15. The at least one server node of claim 13, wherein:
the at least one SDI service is related, at least in part, to:
software as a service;
platform as a service; and/or
infrastructure as a service.

16. At least one data center comprising:
at least one network node;
distributed data center-associated resources configurable to comprise virtual resources to be associated with physical compute resources, physical storage resources, and/or physical accelerator resources; and
at least one server node to be used in association with the at least one network node, the at least one server node comprising:
  network interface controller circuitry to be configured to be used in network communication with the at least one network node; and
  processor circuitry to execute instructions, the instructions, when executed by the processor circuitry, resulting in the processor circuitry being configured to enable performance of operations comprising:
    managing, based upon quality of service data, machine-learning, and workload-related data, allocation of the distributed data center-associated resources for use in providing at least one software-defined infrastructure (SDI) resource and/or at least one SDI service, the managing of the allocation of the distributed data center-associated resources being configurable to be implemented based upon telemetry data associated with the distributed data center-associated resources;
    dynamically reallocating at least certain of the distributed data center-associated resources based upon resource utilization data; and
    utilizing accelerator circuitry of the network interface controller circuitry in association with implementation of service agreements associated with the providing of the at least one SDI resource and/or the at least one SDI service;
wherein:
  the distributed data center-associated resources are comprised, at least in part, in the at least one server node and the at least one network node;
  the accelerator circuitry is configurable to implement cryptographic-related operations and network communication-related operations in association with the implementation of the service agreements;
  the implementation of the service agreements is configurable to comprise enforcement of quality of service;
  the physical compute resources and/or physical accelerator resources are configurable to comprise physical central processing unit circuitry, graphics processing unit circuitry, and/or field programmable gate array (FPGA) circuitry;
  at least respective portions of the distributed data center-associated resources are configurable as at least one pool of resources; and
  at least some of the distributed data center-associated resources are physically disaggregated from each other.

17. The at least one data center of claim 16, wherein:
the network interface controller circuitry is to be associated with cache memory; and
the cache memory is to store network communication-related data for use in the network communication-related operations.

18. The at least one data center of claim 16, wherein:
the resource utilization data comprises predicted workload resource utilization data.

19. The at least one data center of claim 18, wherein:
the network communication is to be carried out via at least one distributed virtual switch; and
the at least one distributed virtual switch is to be implemented, at least in part, by disaggregated resources.

20. The at least one data center of claim 18, wherein:
the at least one SDI service is related, at least in part, to:
software as a service;
platform as a service; and/or
infrastructure as a service.

* * * * *